(12) United States Patent
Bayrakeri et al.

(10) Patent No.: US 6,704,359 B1
(45) Date of Patent: Mar. 9, 2004

(54) EFFICIENT ENCODING ALGORITHMS FOR DELIVERY OF SERVER-CENTRIC INTERACTIVE PROGRAM GUIDE

(75) Inventors: Sadik Bayrakeri, Foster City, CA (US); Donald F. Gordon, Los Altos, CA (US); Edward A. Ludvig, Redwood City, CA (US); John P. Comito, Redwood City, CA (US); Jeremy S. Edmonds, Castro Valley, CA (US); Eugene Gershtein, Redwood City, CA (US)

(73) Assignee: Diva Systems Corp., Redwood City, CA (US)

( * ) Notice: Subject to any disclaimer, the term of this patent is extended or adjusted under 35 U.S.C. 154(b) by 667 days.

(21) Appl. No.: 09/602,547

(22) Filed: Jun. 21, 2000

Related U.S. Application Data

(63) Continuation-in-part of application No. 09/384,394, filed on Aug. 27, 1999, now Pat. No. 6,621,870, and a continuation-in-part of application No. 09/359,559, filed on Jul. 22, 1999, and a continuation-in-part of application No. 09/293,526, filed on Apr. 15, 1999.
(60) Provisional application No. 60/141,297, filed on Jun. 28, 1999.

(51) Int. Cl.⁷ .............................. H04B 1/66; G06F 3/00; H04N 9/64
(52) U.S. Cl. ..................... 375/240.12; 725/39; 348/699
(58) Field of Search ....................... 375/240.12, 240.13, 375/240.28, 240, 240.27; 345/721; 348/654, 409.1, 699, 700; 725/43, 66, 68, 138, 39, 40, 54, 139

(56) References Cited

U.S. PATENT DOCUMENTS

| | | |
|---|---|---|
| 4,290,063 A | 9/1981 | Traster ....................... 340/723 |
| 4,437,093 A | 3/1984 | Bradley ...................... 340/726 |
| 4,496,976 A | 1/1985 | Swanson et al. ............. 358/147 |
| 4,520,356 A | 5/1985 | O'Keefe et al. ............. 340/750 |
| RE32,187 E | 6/1986 | Barda et al. ................. 340/706 |
| 4,600,921 A | 7/1986 | Thomas .................. 340/825.31 |
| 4,633,297 A | 12/1986 | Skerlos et al. ................. 358/22 |
| 4,706,121 A | 11/1987 | Young ......................... 358/142 |
| 4,712,239 A | 12/1987 | Frezza et al. .................. 380/20 |
| 4,734,764 A | 3/1988 | Pocock et al. ................. 358/86 |
| 4,739,318 A | 4/1988 | Cohen ......................... 340/750 |
| 4,742,344 A | 5/1988 | Nakagawa et al. .......... 340/723 |
| 4,745,468 A | 5/1988 | Von Kohorn ................. 358/84 |

(List continued on next page.)

*Primary Examiner*—Gims Philippe
(74) *Attorney, Agent, or Firm*—Moser, Patterson & Sheridan LLP

(57) ABSTRACT

A data structure for representing program data that includes a number of streams. Each stream comprises a group of pictures (GOP) having a first picture and remaining pictures. The data structure includes a first set of one or more elements for representing data for the first pictures in the GOPs, and a second set of one or more elements for representing data for the remaining pictures in the GOPs. At least one element in the first set represents data for the first picture of at least one respective GOP, with each such first picture having been encoded as a reference I picture. Each remaining element (if any) in the first set represents data for the first picture of a respective remaining GOP, with each such remaining first picture having been encoded as either a difference picture or a P picture. Each element in the second set represents data for a particular remaining picture in one of the GOPs, with each such remaining picture having been encoded as either a P or B picture. Each stream is represented by one or more elements in the first set and one or more elements in the second set.

31 Claims, 15 Drawing Sheets

U.S. PATENT DOCUMENTS

| | | | |
|---|---|---|---|
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 4,706,121 A | 12/1993 | Young | 358/142 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,448,568 A | 9/1995 | Delpuch et al. | |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,550,576 A | 8/1996 | Klosterman | 348/6 |
| 5,552,837 A | 9/1996 | Mankovitz | 348/734 |
| 5,553,123 A | 9/1996 | Chan et al. | 379/102 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,592,551 A | 1/1997 | Lett et al. | 380/20 |
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,274 A | 4/1997 | Roop et al. | 348/461 |
| 5,619,383 A | 4/1997 | Ngai | 360/20 |
| 5,621,579 A | 4/1997 | Yuen | 386/121 |
| 5,630,119 A | 5/1997 | Aristides et al. | 395/601 |
| 5,644,354 A | 7/1997 | Thompson et al. | 348/13 |
| 5,659,367 A | 8/1997 | Yuen | 348/465 |
| 5,668,599 A | 9/1997 | Cheney et al. | |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,701,383 A | 12/1997 | Russo et al. | 386/46 |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,751,282 A | 5/1998 | Girard et al. | 345/327 |
| 5,754,940 A | 5/1998 | Smith et al. | 455/5.1 |
| 5,757,416 A | 5/1998 | Birch et al. | 348/6 |
| 5,764,739 A | 6/1998 | Patton et al. | 379/106.03 |
| 5,768,539 A | 6/1998 | Metz et al. | |
| 5,771,064 A | 6/1998 | Lett | 348/10 |
| 5,790,198 A | 8/1998 | Roop et al. | 348/460 |
| 5,790,806 A | 8/1998 | Koperda | 395/200.82 |
| 5,801,753 A | 9/1998 | Eyer et al. | 348/13 |
| 5,801,787 A | 9/1998 | Schein et al. | 348/569 |
| 5,805,204 A | 9/1998 | Thompson et al. | 348/13 |
| 5,808,608 A | 9/1998 | Young et al. | 345/327 |
| 5,809,204 A | 9/1998 | Young et al. | 386/83 |
| 5,812,205 A | 9/1998 | Milnes et al. | 348/460 |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |
| 5,844,620 A | 12/1998 | Coleman | 348/461 |
| 5,850,218 A | 12/1998 | Lajoie et al. | 345/327 |
| 5,852,478 A | 12/1998 | Kwoh | 348/734 |
| 5,854,840 A | 12/1998 | Cannella, Jr. | 380/9 |
| 5,861,881 A | 1/1999 | Freeman et al. | |
| 5,867,208 A * | 2/1999 | McLaren | 725/139 |
| 5,870,150 A | 2/1999 | Yuen | 348/553 |

| | | | | | | |
|---|---|---|---|---|---|---|
| 5,870,474 A | | 2/1999 | Wasilewski et al. ......... 380/21 | 6,157,673 A | * 12/2000 | Cuccia ..................... 375/240 |
| 5,880,768 A | | 3/1999 | Lemmons ..................... 348/1 | 6,481,012 B1 | * 11/2002 | Gordon et al. ................ 725/54 |
| 5,915,068 A | | 6/1999 | Levine ....................... 386/83 | 6,584,153 B1 | * 6/2003 | Gordon et al. ......... 375/240.13 |
| 5,949,476 A | | 9/1999 | Pocock et al. ................ 348/24 | 6,621,870 B1 | * 9/2003 | Gordon et al. ......... 375/240.28 |
| 6,005,562 A | * | 12/1999 | Shiga et al. ................ 345/721 | | | |
| 6,141,385 A | * | 10/2000 | Yamaji .................. 375/240.27 | * cited by examiner | | |

EFFICIENT ENCODING ALGORITHMS FOR DELIVERY OF SERVER-CENTRIC INTERACTIVE PROGRAM GUIDE

CROSS-REFERENCES TO RELATED APPLICATIONS

This application claims the benefit of U.S. provisional Application Ser. No. 60/141,297, entitled "DATA STRUCTURE AND APPARATUS FOR EFFICIENT DELIVERY OF INTERACTIVE PROGRAM GUIDE IN AN INTERACTIVE TELEVISION ENVIRONMENT," filed Jun. 28, 1999, which is incorporated herein by reference in its entirety for all purposes.

This application is a continuation-in-part of U.S. patent application Ser. No. 09/293,526, entitled "IMPROVED DATA STRUCTURE AND METHODS FOR PROVIDING AN INTERACTIVE PROGRAM GUIDE," filed Apr. 15, 1999, Ser. No. 09/359,559, entitled "DATA STRUCTURE AND METHODS FOR PROVIDING AN INTERACTIVE PROGRAM GUIDE," filed Jul. 22, 1999, and Ser. No. 09/384,394, entitled "METHOD AND APPARATUS FOR COMPRESSING VIDEO SEQUENCES," filed Aug. 27, 1999, all of which are assign to the assignee of the present invention and incorporated herein by reference in their entirety for all purposes.

BACKGROUND OF THE INVENTION

The invention relates to communications systems in general and, more specifically, the invention relates to a video compression technique suitable for use in an interactive multimedia information delivery system.

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of services such as pay per view (PPV) or video on demand (VOD), limited scheduling flexibility for the information provider.

The use of compression techniques to reduce the amount of data to be transmitted may increase the speed of transmitting program guide information. In several communications systems, the data to be transmitted is compressed so that the available transmission bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable rate digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

However, the MPEG-1 and MPEG-2 standards have, in some instances, very strict elementary stream and transport stream formats, causing usage of extra bandwidth for certain applications. For example, if a number of interactive program guide (IPG) pages were created as video sequences, only limited number of pages could be encoded into a transport stream(s) at a specified bandwidth.

Therefore, it is desirable to provide a video compression and decompression technique that enables an increased number of programs (video sequences) to be transmitted within an MPEG-2 transport stream(s).

SUMMARY OF THE INVENTION

The invention provides various data structures suitable for efficient representation of program data (e.g., program guide information for a number of groups of channels) having some amount of common (i.e., redundant) information. Depending on the particular program data, redundant textual and/or video information may be present. Pictures containing redundant information may be discarded from processing, and pictures containing non-redundant information may be processed using more efficient coding techniques (e.g., coding of difference frames). The encoding and transmission of reference I frames are also minimized. The removal of redundant information and efficient encoding of transmitted information greatly reduce the bandwidth and/or memory resources needed to transmit and/or store the program data.

An embodiment of the invention provides a data structure for representing program data that includes a number of (video) streams. Each stream comprises a group of pictures (GOP) having a first picture and one or more remaining pictures. The data structure includes a first set of one or more elements for representing data for the first pictures in the GOPs, and a second set of one or more elements for representing data for the remaining pictures in the GOPs. At least one element in the first set represents data for (at least a portion of) the first picture of at least one respective GOP, with each such first picture having been encoded as a reference I picture. Each remaining element (if any) in the first set represents data for (at least a portion of) the first picture of a respective remaining GOP, with each such remaining first picture having been encoded as either a difference picture or a P picture. Each element in the second set represents data for (at least a portion of) a particular remaining picture in one of the GOPs, with each such remaining picture having been encoded as either a P picture, a B picture, or an I picture. Each of the streams is represented by one or more elements in the first set and one or more elements in the second set.

As noted above, various data structures are provided by the invention. In one specific data structure design, the first set includes a number of elements, one element for each of the GOPs. Each element in the first set can represent data for the first picture of a respective GOP encoded as a reference I picture. Alternatively, one element in the first set can represent data for the first picture of one GOP encoded as a reference I picture, and each remaining element in the first set can represent data for the first picture of a respective remaining GOP encoded as a difference picture. The first set can also include a single element for representing data for the first picture of one GOP.

In this specific data structure design, the second set can include a number of elements (e.g., one element for each remaining picture in one particular GOP). The elements in the second set can represent data for a single GOP, with each remaining picture in this GOP having been encoded as either a P picture or a B picture. Alternatively, the elements in the second set can represent data for at least one remaining picture of each of the GOPs.

Each picture of the GOPs can include, for example, a first portion indicative of textual information (e.g., program guide) and a second portion indicative of video information (e.g., a moving video). In a specific implementation, the first and remaining pictures of each GOP share a common first portion, and the first pictures of the GOPs share a common second portion. The text portion can be encoded using a text encoder or an encoder adapted for encoding text.

In another specific data structure design, the elements are used to represent data for GOPs having a common first (e.g., text) portion but each GOP having a second portion (e.g., a video sequence) that may be different from those of other GOPs. The first portion of the first picture of one of the GOPs can be encoded and used as a reference first portion. The second portion of the first picture of each GOP having an unduplicated second portion can also be encoded as a reference second portion for that GOP. The second portion of the remaining pictures in each GOP can then be encoded based on the reference second portion generate for the first picture in the GOP.

The data structures described herein can be used to represent data for a matrix that may include any number of GOPs or streams (e.g., 15 or more), with each GOP including any number of pictures (e.g., 15 or more). The pictures can be encoded using picture-based encoding, slice-based encoding, or some other encoding technique. Also, the encoding can be achieved with a software (e.g., MPEG-2) encoder, a hardware encoder, or a combination thereof. For example, the text portion can typically be efficiently encoded with a software MPEG-2 encoder.

The invention further provides systems (e.g., head-ends) and set top terminals that implement and/or process the data structures described herein.

The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

This invention is a system for generating, distributing and receiving a stream containing compressed video information from a substantial number of video sequences. The invention is illustratively used to encode a plurality of interactive program guides that enable a user to interactively review, preview and select programming for a television system.

A. System

Figure 1:
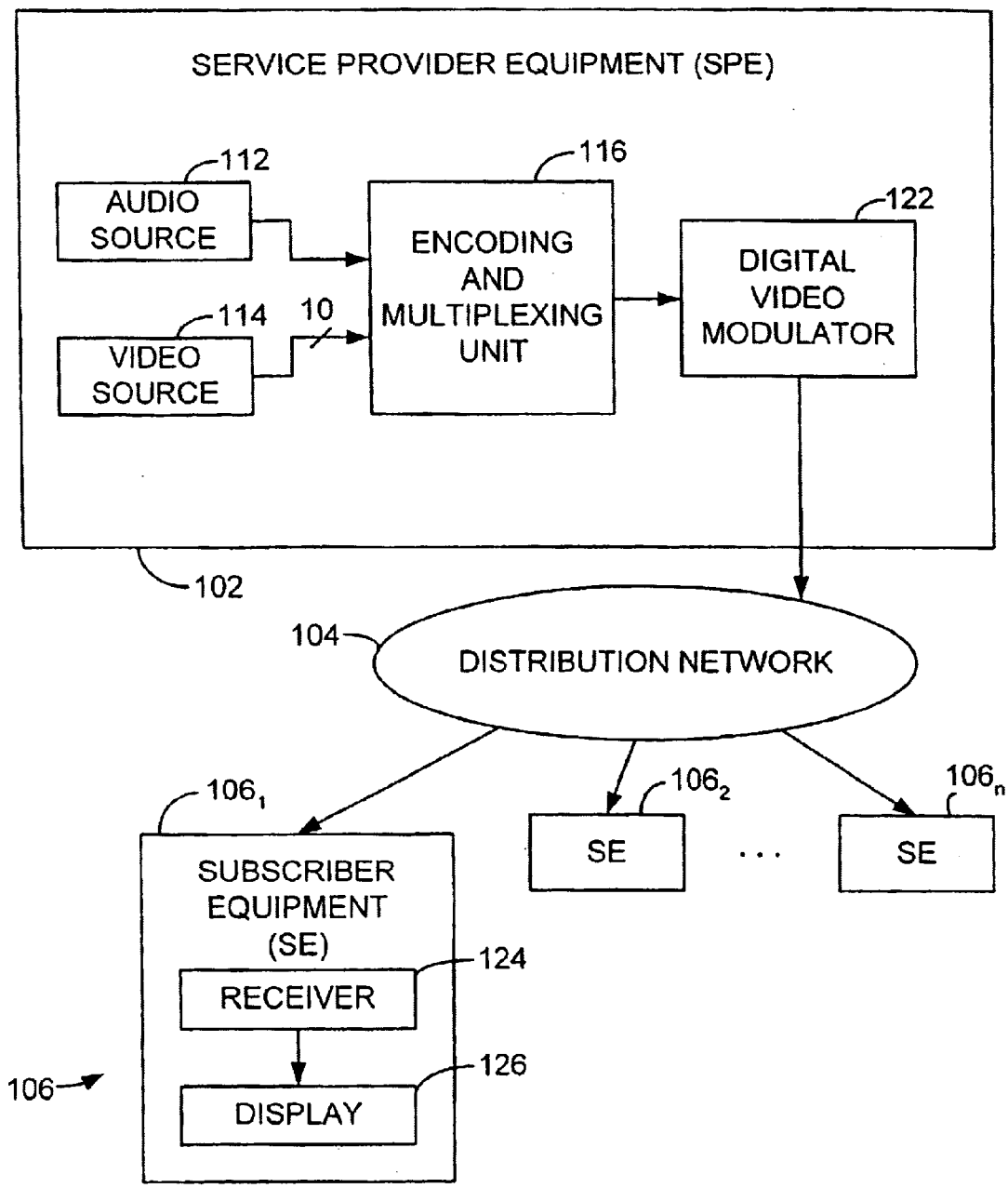
FIG. 1 depicts a block diagram of an illustrative interactive information distribution system that includes the encoding unit and process of the present invention.

FIG. 1 depicts a high-level block diagram of an information distribution system 100, e.g., a video-on-demand system or digital cable system, which incorporates the present invention. The system 100 contains service provider equipment (SPE) 102 (e.g., a head end), a distribution network 104 (e.g., hybrid fiber-coax network) and subscriber equipment (SE) 106. This form of information distribution system is disclosed in commonly assigned U.S. patent application Ser. No. 08/984,710 filed Dec. 3, 1997. The system is known as DIVA provided by DIVA Systems Corporation.

In general, the SPE 102 produces a plurality of digital streams that contain encoded information in MPEG compressed format. These streams are modulated using a modulation format that is compatible with the distribution network 104. The subscriber equipment 106, at each subscriber location 1061, 1062, ¼, 106n, comprises a receiver 124 and a display 126. Upon receiving a stream, the subscriber equipment receiver 124 extracts the information from the received signal and decodes the stream to produce the information on the display, i.e., produce a television program, program guide page, or other multimedia program.

In an interactive information distribution system such as the one described in commonly assigned U.S. patent application Ser. No. 08/984,710, filed Dec. 3, 1997, the program streams are addressed to particular subscriber equipment locations that requested the information through an interactive menu. A related interactive menu structure for requesting video on demand is disclosed in commonly assigned U.S. patent application Ser. No. 08/984,427, filed Dec. 3, 1997. Another example of interactive menu for requesting multimedia services is the interactive program guide (IPG) disclosed in commonly assigned U.S. patent application Ser. No. 60/093,891, filed in Jul. 23, 1998. These applications are incorporated herein by reference.

To assist a subscriber (or other viewer) in selecting programming, the SPE 102 produces an interactive program guide that is compressed for transmission in accordance with the present invention. The IPG contains program information, e.g., title, time, channel, program duration and the like, as well at least one region displaying full motion video, i.e., a television advertisement or promotion. Such informational video is provided in various locations within the program guide screen.

The invention produces the IPG using a compositing technique that is described in commonly assigned U.S. patent application Ser. No. 09/201,528, filed Nov. 30, 1998, and application Ser. Nos. 09/359,562 09/359,561 filed Jul. 23, 1999, which are hereby incorporated by reference herein. The compositing technique, which will not be discussed further herein, enables full motion video to be positioned within an IPG and have the video seamlessly transition from one IPG page to another. The composited IPG pages (i.e., a plurality of video frame sequences) are coupled from a video source 114 to an encoding and multiplexing unit 116 of the present invention. Audio signals associated with the video sequences are supplied by an audio source 112 to the encoding and multiplexing unit 116.

The encoding and multiplexing unit 116 compresses the frame sequences into a plurality of elementary streams. The elementary streams are further processed to remove redundant predicted frames. A multiplexer within unit 116 then assembles the elementary streams into a transport stream.

The transport stream is then modulated by the digital video modulator 122 using a modulation format that is compatible with the distribution network 104. For example, in the DIVA™ system the modulation is quadrature amplitude modulation (QAM); however, other modulation formats could be used.

The subscriber equipment 106 contains a receiver 124 and a display 126 (e.g., a television). The receiver 124 demodulates the signals carried by the distribution network 104 and decodes the demodulated signals to extract the IPG pages from the stream. The details of the receiver 124 are described below with respect to FIG. 5.

B. Encoding and Multiplexing Unit 116

Figure 2:
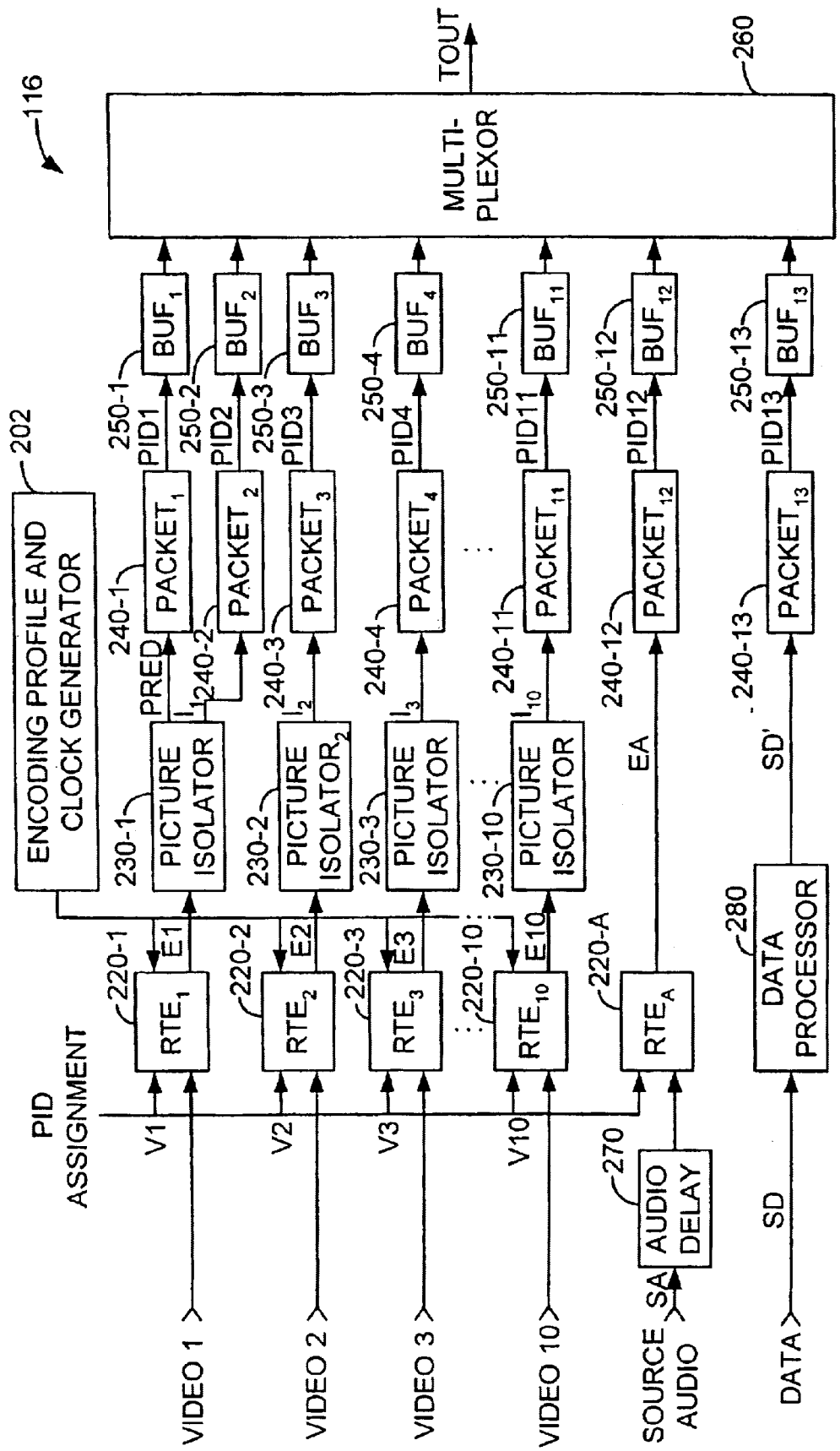
FIG. 2 depicts a block diagram of an encoding and multiplexing unit in accordance with the present invention.

FIG. 2 depicts a block diagram of the encoding and multiplexing unit 116 of FIG. 1, which produces a transport stream comprising a plurality of encoded video, audio, and data elementary streams. The invented system is designed specifically to work in an ensemble encoding environment, where a plurality of video streams are generated to compress video information that carries common and non-common content. Ideally, the common content is encoded into a single elementary stream and the non-common content is encoded into separate elementary streams. However, in a practical MPEG encoding process, some common information will appear in the stream intended to carry non-common information and some non-common information will appear in the stream intended to carry common information. In this way, the common content is not duplicated in every stream, yielding significant bandwidth savings. Although the following description of the invention is presented within the context of IPG, it is important to note that the method and apparatus of the invention is equally applicable to a broad range of applications, such as broadcast video on demand delivery, e-commerce, internet video education services, and the like, where delivery of video sequences with command content is required.

Specifically, the encoding and multiplexing unit 116 receives a plurality of video sequences V1–V10 and, optionally, one or both of a audio signal SA and a data signal SD.

The video sequences V1–V10 include imagery common to each other, e.g., common IPG background information and common video portion information. On the other hand, the programming information (program grid graphic) is different in every sequence V1–V10.

The audio source SA comprises, illustratively, audio information that is associated with a video portion in the video sequences such as an audio track associated with still or moving images. For example, in the case of video sequence V1 representing a movie trailer, the audio stream SA is derived from the source audio (e.g., music and voice-over) associated with the music trailer.

The data stream SD comprises, illustratively, overlay graphics information, textual information describing programming indicated by the guide region and other system or user interface related data. The data stream SD can be separately encoded into its own elementary stream or included within the MPEG-2 or other suitable standard or proprietary transport stream suitable for use in the information distribution system of FIG. 1, as private data, auxiliary data, and the like.

The encoding and multiplexing unit 116 comprises a plurality of real time MPEG-2 encoders 220-1 through 220-10 (collectively encoders 220), an encoding profile and clock generator 202, a plurality of picture isolators 230-1 through 230-10 (collectively picture isolators 230), a plurality of packetizers 240-1 through 240-13 (collectively packetizers 240), a plurality of buffers 250-1 through 250-13 (collectively buffers 250), a transport multiplexer 260, an audio delay element 270 and an optional data processor 280.

The video sequences V1–V10 are coupled to respective real time encoders 220. Each encoder 220 encodes, illustratively, a composited IPG screen sequence to form a corresponding compressed video bit stream, e.g., an MPEG-2 compliant bit stream having associated with it a predefined group of pictures (GOP) structure. A common clock and encoding profile generator 202 provides a clock and profile to each encoder 220 to ensure that the encoding timing and encoding process occur similarly for each video sequence V1–V10. As such, the encoding is performed in a synchronous manner.

For purposes of this discussion, it is assumed that the GOP structure consists of an I-picture followed by ten B-pictures, where a P-picture separates each group of two B-pictures (i.e., "I-B-B-P-B-B-P-B-B-P-B-B-P-B-B"), however, any GOP structure and size may be used in different configurations and applications. It is preferable that the same encoding profile, including the GOP structure, is used by each of the real time encoders 220 to have uniform encoding across multiple streams and to produce approximately the same size encoded I- and Predicted-Pictures. Moreover, by utilizing the same profile and predefined GOP structure, multiple instances of the same encoder are used to realize the encoding and multiplexing unit 116, thereby driving down costs. Note also that the encoding process can be performed by one encoder or a plurality of encoders depending on implementation choice.

Each of the real time encoders 220 produces an encoded MPEG-2 bit stream (E1–E10) that is coupled to a respective picture isolator 230. Each of the picture isolators 230 examines the encoded video stream to isolate I-pictures within the MPEG-2 compliant streams E1–E10, by analyzing the stream access units associated with I-, P- and B-pictures.

The first picture isolator 230-1 receives the MPEG-2 compliant stream E1 from the first real time encoder 220-1 and responsively produces two output bit streams PRED and I1. The remaining picture isolators 230-2 to 230-10 produces only I frame streams. Note that the PRED stream can be generated by any one of the picture isolators.

The picture isolators 230 process the received streams E1–E10 according to the type of picture (I-, P- or B-picture) associated with a particular access unit and also the relative position of the pictures within the sequence and group of pictures. As noted in the MPEG-1 and MPEG-2 specifications, an access unit comprises a coded representation of a presentation unit. In the case of audio, an access unit is the coded representation of an audio frame. In the case of video, an access unit includes all the coded data for a picture and any stuffing bits that follows it, up to but not including the start of the next access unit. If a picture is not preceded by a group start code or a sequence header code, then the corresponding access unit begins with the picture start code. If the picture is preceded by a group start code and/or a sequence header code (e.g., an I-picture), then the corresponding access unit begins with the first byte of the first start code in the sequence or a GOP. If the picture is the last picture preceding a sequence end code in the stream, then all bytes between the last byte of the coded picture and the sequence end code (including the sequence end code) belong to the access unit. Each of the remaining B- and P-picture access units in a GOP includes a picture start code. The last access unit of the GOP (e.g., a terminating B-picture) includes, in addition, a sequence end code indicating the termination of the GOP.

The $I_1$ stream, as the first picture of the sequence, consists of a sequence header, a sequence extension, GOP header, picture header, picture extension, and I-picture data until the next picture start code. By contrast, the PRED stream comprises only P- and B-picture access units, starting from the second picture start code (illustratively a B-picture) and all data until the next group start code, thereby including all access units of the GOP except those representing the I-picture.

Each of the second 230-2 through tenth 230-10 picture isolators receive, respectively, the MPEG-2 compliant streams E2 through E10 from the corresponding real time encoders 220-2 through 220-10, each producing one respective output stream $I_1$–$I_{10}$ comprising only the sequence header and all data until the respective second picture start codes (i.e., the access unit data associated with an I-picture at the beginning of the respective GOP).

Figure 3:
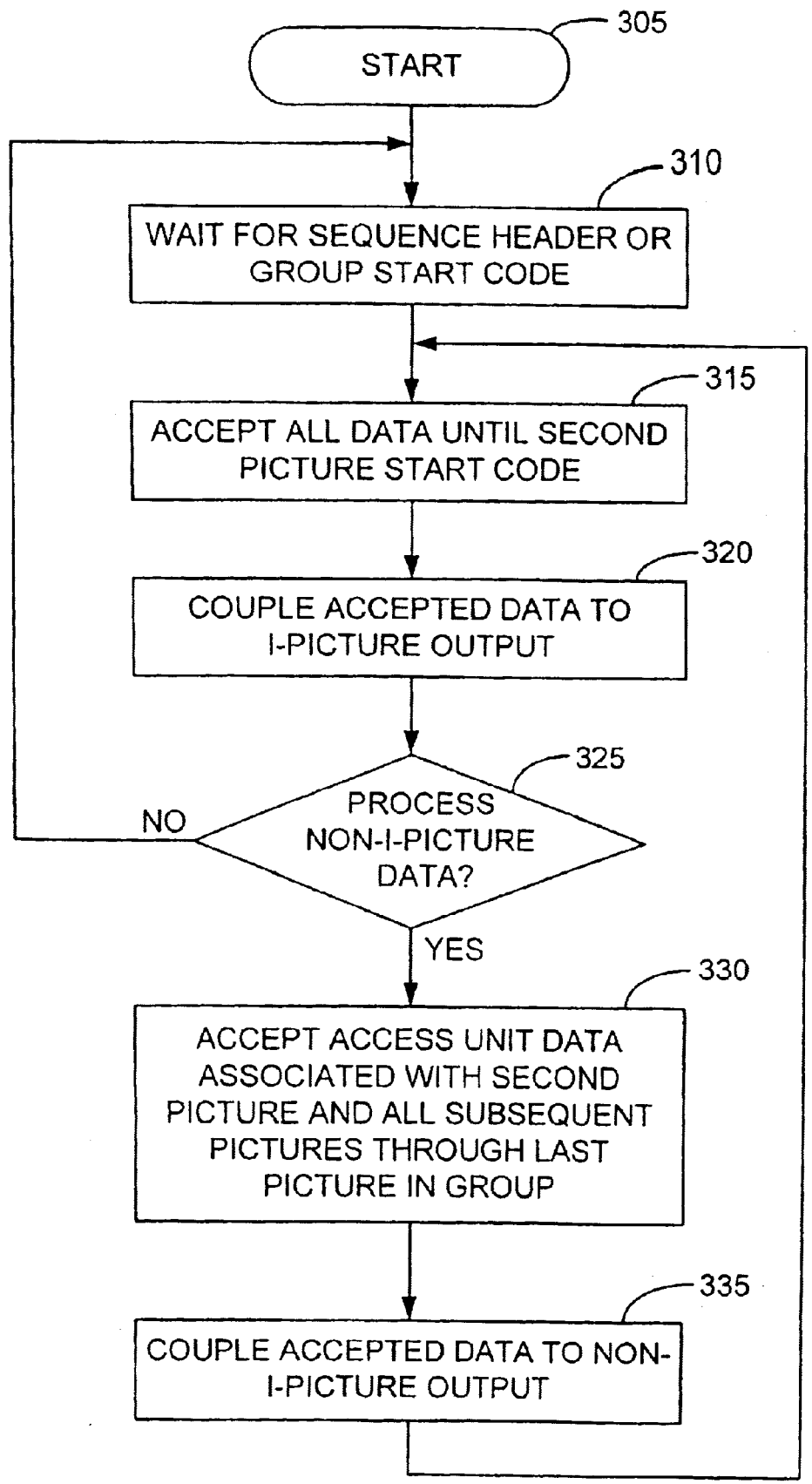
FIG. 3 is a flow diagram of a process used by a picture isolator.

FIG. 3 illustrates a high-level flow sequence in isolating pictures suitable for use in the picture isolators unit 230 of FIG. 2. The picture isolator method 300 is entered at step 305 and proceeds to step 310, where it waits for a sequence header or a group start code, upon detection of which it proceeds to step 315. At step 315, the sequence header and all data until the second picture start code is accepted. The method 300 then proceeds to step 320.

At step 320, the accepted data is coupled to the I-picture output of the picture isolator. In the case of picture isolators 230-2 through 230-10, since there is no PB output shown, the accepted data (i.e., the sequence header, I-picture start code and I-picture) is coupled to a sole output. The method 400 then proceeds to step 325.

At step 325, a query is made as to whether non-I-picture data is to be processed. That is, a query is made as to whether non-I-picture data is to be discarded or coupled to a packetizer. If the query at step 325 is answered negatively (non-I-picture data is discarded) then the method 300 proceeds to step 310 to wait for the next sequence header. If the query at step 325 is answered affirmatively, then the method 300 proceeds to step 330.

At step 330, the second picture start code and all data in a GOP until the next group start code is accepted. The method 400 then proceeds to step 335. At step 335, the accepted data is coupled to the non-I-picture output of the frame isolator 230 to form the PRED stream.

In summary, the picture isolator method 300 examines the compressed video stream produced by the real time encoder 220 to identify the start of a GOP, the start of an I-picture (first picture start code after the group start code) and the start of predicted-pictures (second picture start code after the group start code) forming the remainder of a GOP. The picture isolator method couples the I-pictures and predicted-pictures to packetizers for further processing in conformance with the invention.

The first packetizer 240-1 packetizes the PRED stream into a plurality of fixed length transport packets according to, e.g., the MPEG-2 standard. Additionally, the first packetizer 240-1 assigns a packet identification (PID) of, illustratively, one (1) to each of the packets representing information from the PRED stream, thereby producing a packetized stream PID-1. The second packetizer 240-2 packetizes the I stream to produce a corresponding packetized stream PID-2.

The $I_2$ through $I_{10}$ output streams of the second 230-2 through tenth 230-10 picture isolators are coupled to, respectively, third 240-3 through eleventh 240-11 transport packetizers, which produce respective packetized streams PID-3–PID-11.

In addition to the video information forming the ten IPG screens, audio information associated with IPG screens is encoded and supplied to the transport multiplexer 260. Specifically, the source audio signal is subjected to an audio delay 270 and then encoded by a real time audio encoder 220-A, illustratively a Dolby AC-3 real time encoder, to produce an encoded audio stream EA. The encoded stream EA is packetized by a $12^{th}$ transport packetizer 240-12 to produce a transport stream having a PID of 12 (PID-12). The PID-12 transport stream is coupled to a 12$^{th}$ buffer 250-12.

The IPG grid foreground and overlay graphics data is coupled to the transport multiplexer 260 as a data stream having a PID of thirteen (PID-13). The data stream is produced by processing the data signal SD as related for the application using the data processor 280 and packetizing the processed data stream SD' using the thirteenth packetizer 240-13 to produce the PID-13 signal, which is coupled to the thirteenth buffer 250-13.

Each of the transport packetized streams PID-1–PID-11 is coupled to a respective buffer 250-1 through 250-11, which is in turn coupled to a respective input of the multiplexer 260, illustratively an MPEG-2 transport multiplexer. While any type of multiplexer will suffice to practice the invention, the operation of the invention is described within the context of an MPEG-2 transport multiplexing system.

A transport stream, as defined in ISO standard 13818-1 (commonly known as MPEG-2 systems specification), is a sequence of equal sized packets, each 188 bytes in length. Each packet has a 4 bytes of header and 184 bytes of data. The header contains a number of fields, including a PID field. The PID field contains thirteen bits and uniquely identifies each packet that contains a portion of a "stream" of video information as well as audio information and data. As such, to decode a particular video stream (or audio or data stream ) for viewing or presentation, the decoder in the subscriber or user equipment extracts packets containing a particular PID and decodes those packets to create the video (or audio or data) for viewing or presenting.

Each of the thirteen streams representing the IPG is uniquely identified by a PID. In the preferred embodiment, the thirteen streams are multiplexed into a single transport stream. Less or more IPG streams may be included in the transport stream as bandwidth permits. Additionally, more than one transport stream can be used to transmit the IPG streams.

Multiplexer 260 processes the packetized data stored in each of the 13 buffers 250-1 through 250-13 in a round robin basis, beginning with the 13$^{th}$ buffer 250-13 and concluding with the first buffer 250-1. That is, the transport multiplexer 260 retrieves or "drains" the PID 13 information stored within the 13$^{th}$ buffer 250-13 and couples that information to the output stream TOUT. Next, the 12$^{th}$ buffer 250-12 is emptied of packetized data, which is then coupled to the output stream TOUT. Next, the 11th buffer 250-11 is emptied of packetized data which is then coupled to the output stream TOUT and so on until the 1st buffer 250-1 is emptied of packetized data which is then coupled to the output stream TOUT. It is important to note that the processing flow is synchronized such that each output buffer includes all the access units associated with an I-picture (250-2 through 250-11) suitable for referencing a GOP, a particular group of P- and B-pictures (250-1) suitable for filling out the rest of the GOP, a particular one or more audio access units (250-12) and an related amount of data (250-13). The round robin draining process is repeated for each buffer, which has been filled in the interim by new transport packetized streams PID-13 to PID-1.

Figure 4:
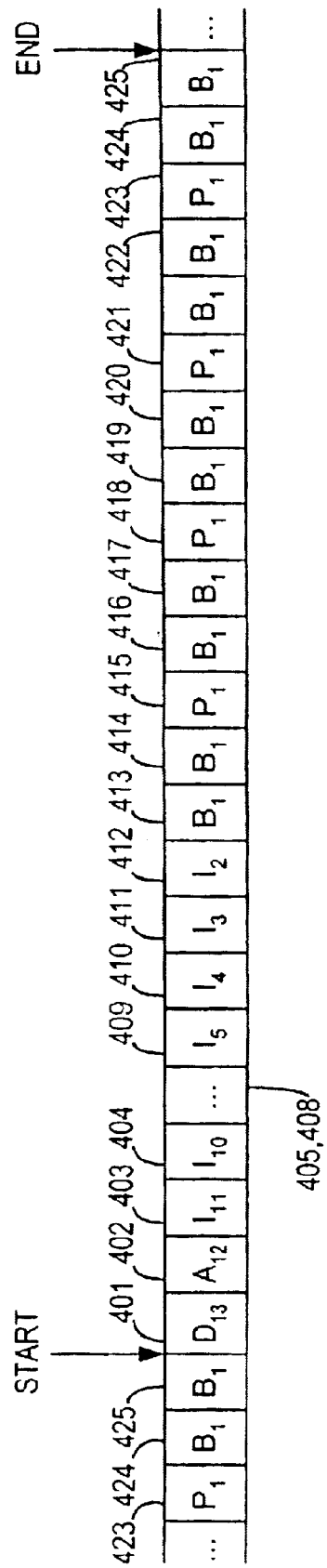
FIG. 4 depicts a data structure of a transport stream that is generated in accordance with the present invention.

FIG. 4 depicts a data structure 400 for a transport stream produced by the encoding and multiplexing unit as a result of processing in a round robin basis. The figure shows one GOP portion of a transport stream, which is indicated by "START" and "END" phrases. The data structure starts with data transport packet 401 having PID-13, then it proceeds with an audio packet 402 having PID-12, which are followed by I-picture packets 403–412 assigned as PID-11 to PID-2. The remaining packets 413 to 425 carry the PRED stream with PID-1. The packets 423 to 425 in the figure show the terminating access units of the previous GOP.

Note that the exemplary data structure and the round robin process are not strictly required for the operation of the invention. The data and audio packets can be placed into different parts of the transport stream, or the sequence of I-picture packets can be changed in a different data structure. The only requirement is that the I-picture related packets should precede the PRED stream in the transport stream if the set top terminal is to decode the stream in one pass without storing any packets. This only requirement, which comes from necessity of decoding the reference I-pictures before the predicted pictures, is removed for set top terminals with additional storage capabilities.

In the preferred embodiment, the exemplary data structure (and related other varied embodiments that still incorporate the above teachings) is encapsulated in one multi-program transport stream. Each program in the program map table (PMT) of MPEG-2 transport stream includes an I-PID (one of the illustrative ten I-PID's 403 to 412), the PRED stream PID-1, data PID-13 401, and audio PID-12 402. Although the multiplexer 260 of FIG. 2 couples a PRED stream access units 413–425 to the multiplexer output TOUT only once per GOP, the PMT for each program references PRED stream PID-1. For the illustrative organization of video input sources in FIG. 2, there would be ten programs, each consisting of one of ten I-PID's 403 to 413, PRED PID-1, audio PID-12, and data PID-13.

In an alternative embodiment, the information packets are formed into a single program and carried with a single program transport stream. In this embodiment, the complete set of PID's 401 to 425 are coupled into a single program.

Yet, in an alternative embodiment, multiple transport streams are employed to transport the data structure (and related other varied embodiments that still incorporate the above teachings) of FIG. 4. In this embodiment, each transport stream is formed in a multi-program manner, where each program comprises an I-PID, PRED-PID, data-PID and an audio PID. The information packets in each transport stream are retrieved in a similar way as a single transport stream. In still an alternative embodiment, the information packets are carried in single program multiple transport streams.

It is important to note that a variety of transport stream formats can be employed to carry the information streams generated by this invention, yet still being retrieved by a receiver that incorporates the teachings introduced in this invention. The resolution of PID's in a program that comprises multiple PID's and then recombination of I- and PRED-PID's require particular attention at the receiver terminal. The related teachings of the receiver recombination techniques are provided in the following sections.

C. Receiver 124

Figure 5:
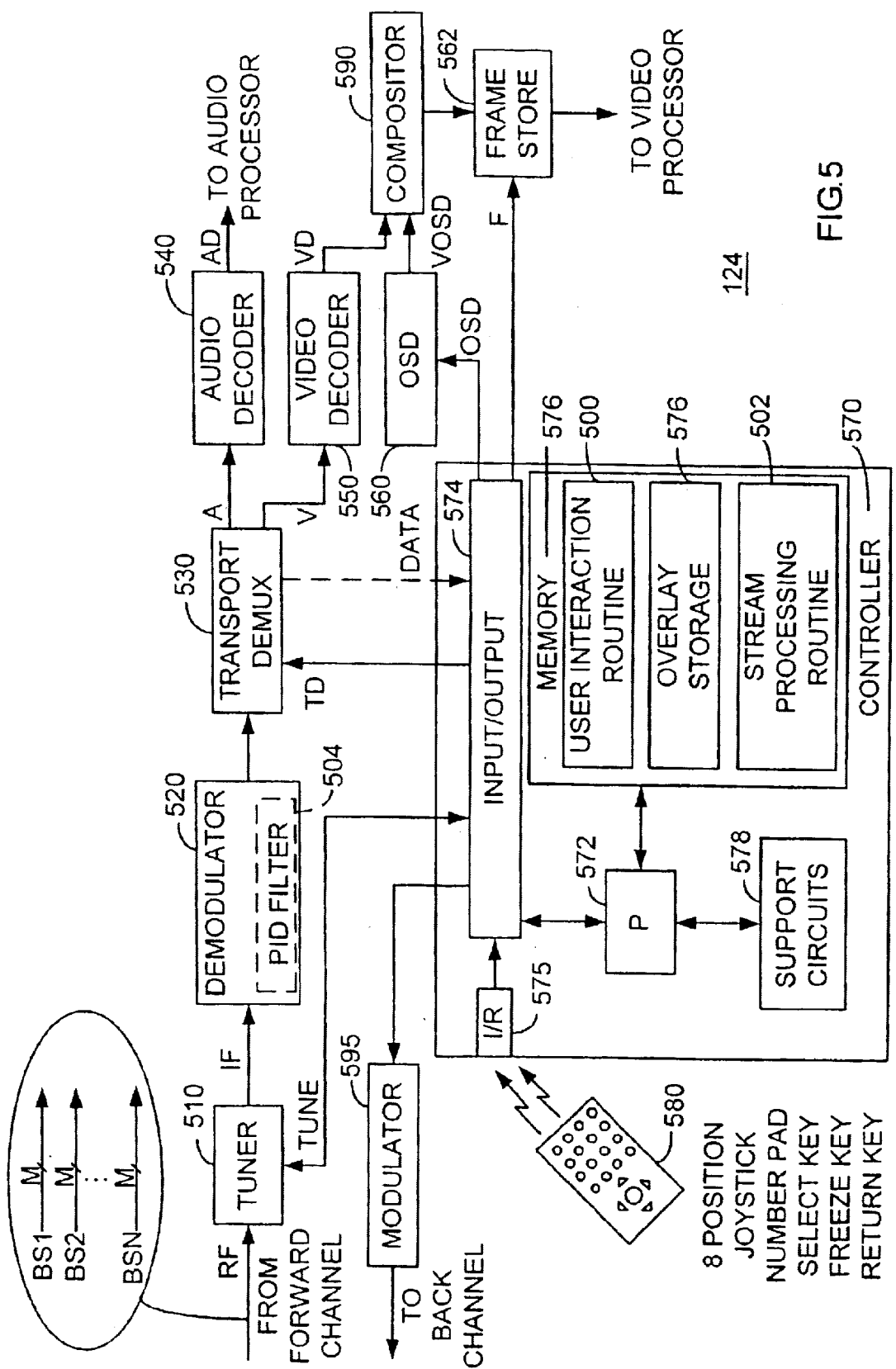
FIG. 5 depicts a block diagram of a receiver within subscriber equipment suitable for use in an interactive information distribution system.

FIG. 5 depicts a block diagram of the receiver 124 (also known as a set top terminal (STT) or user terminal) suitable for use in producing a display of a user interface in accordance with the present invention. The STT 124 comprises a tuner 510, a demodulator 520, a transport demultiplexer 530, an audio decoder 540, a video decoder 550, an on-screen display processor (OSD) 560, a frame store memory 562, a video compositor 590 and a controller 570. User interaction is provided via a remote control unit 580. Tuner 510 receives, e.g., a radio frequency (RF) signal comprising, for example, a plurality of quadrature amplitude modulated (QAM) information signals from a downstream (forward) channel. Tuner 510, in response to a control signal TUNE, tunes a particular one of the QAM information signals to produce an intermediate frequency (IF) information signal. Demodulator 520 receives and demodulates the intermediate frequency QAM information signal to produce an information stream, illustratively an MPEG transport stream. The MPEG transport stream is coupled to a transport stream demultiplexer 530.

Transport stream demultiplexer 530, in response to a control signal TD produced by controller 570, demultiplexes (i.e., extracts) an audio information stream A and a video information stream V. The audio information stream A is coupled to audio decoder 540, which decodes the audio information stream and presents the decoded audio information stream to an audio processor (not shown) for subsequent presentation. The video stream V is coupled to the video decoder 550, which decodes the compressed video stream V to produce an uncompressed video stream VD that is coupled to the video compositor 590. OSD 560, in response to a control signal OSD produced by controller 570, produces a graphical overlay signal VOSD that is coupled to the video compositor 590. During transitions between streams representing the user interfaces, buffers in the decoder are not reset. As such, the user interfaces seamlessly transition from one screen to another.

The video compositor 590 merges the graphical overlay signal VOSD and the uncompressed video stream VD to produce a modified video stream (i.e., the underlying video images with the graphical overlay) that is coupled to the frame store unit 562. The frame store unit 562 stores the modified video stream on a frame-by-frame basis according to the frame rate of the video stream. Frame store unit 562 provides the stored video frames to a video processor (not shown) for subsequent processing and presentation on a display device.

Controller 570 comprises a microprocessor 572, an input/output module 574, a memory 576, an infrared (IR) receiver 575 and support circuitry 578. The microprocessor 572 cooperates with conventional support circuitry 578 such as power supplies, clock circuits, cache memory and the like as well as circuits that assist in executing the software routines that are stored in memory 576. The controller 570 also contains input/output circuitry 574 that forms an interface between the controller 570 and the tuner 510, the transport demultiplexer 530, the onscreen display unit 560, the back channel modulator 595, and the remote control unit 580. Although the controller 570 is depicted as a general-purpose computer that is programmed to perform specific interactive program guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 5, the remote control unit 580 comprises an 8-position joystick, a numeric pad, a "select" key, a "freeze" key and a "return" key. User manipulations of the joystick or keys of the remote control device are transmitted to a controller via an infrared (IR) link. The controller 570 is responsive to such user manipulations and executes related user interaction routines 500, uses particular overlays that are available in an overlay storage 376.

Once received, the video streams are recombined via stream processing routine 502 to form the video sequences that were originally compressed. The following describes three illustrative methods for recombining the streams.

C1. Recombination Method 1

In this method, an I-Picture stream and the PRED stream to be recombined keep their separate PID's until the point where they must be depacketized. The recombination process is conducted within the demultiplexer 530 of the subscriber equipment 106. For illustrative purposes, assuming the preferred embodiment of the transport stream discussed above (multi-program transport stream with each program consisting of an I-PID, PRED-PID, audio-PID, and data-PID), any packet with a PID that matches any of the PID's within the desired program are depacketized and the payload is sent to the elementary stream video decoder. Payloads are sent to the decoder in exactly in the order in which the packets arrive at the demultiplexer.

Figure 6:
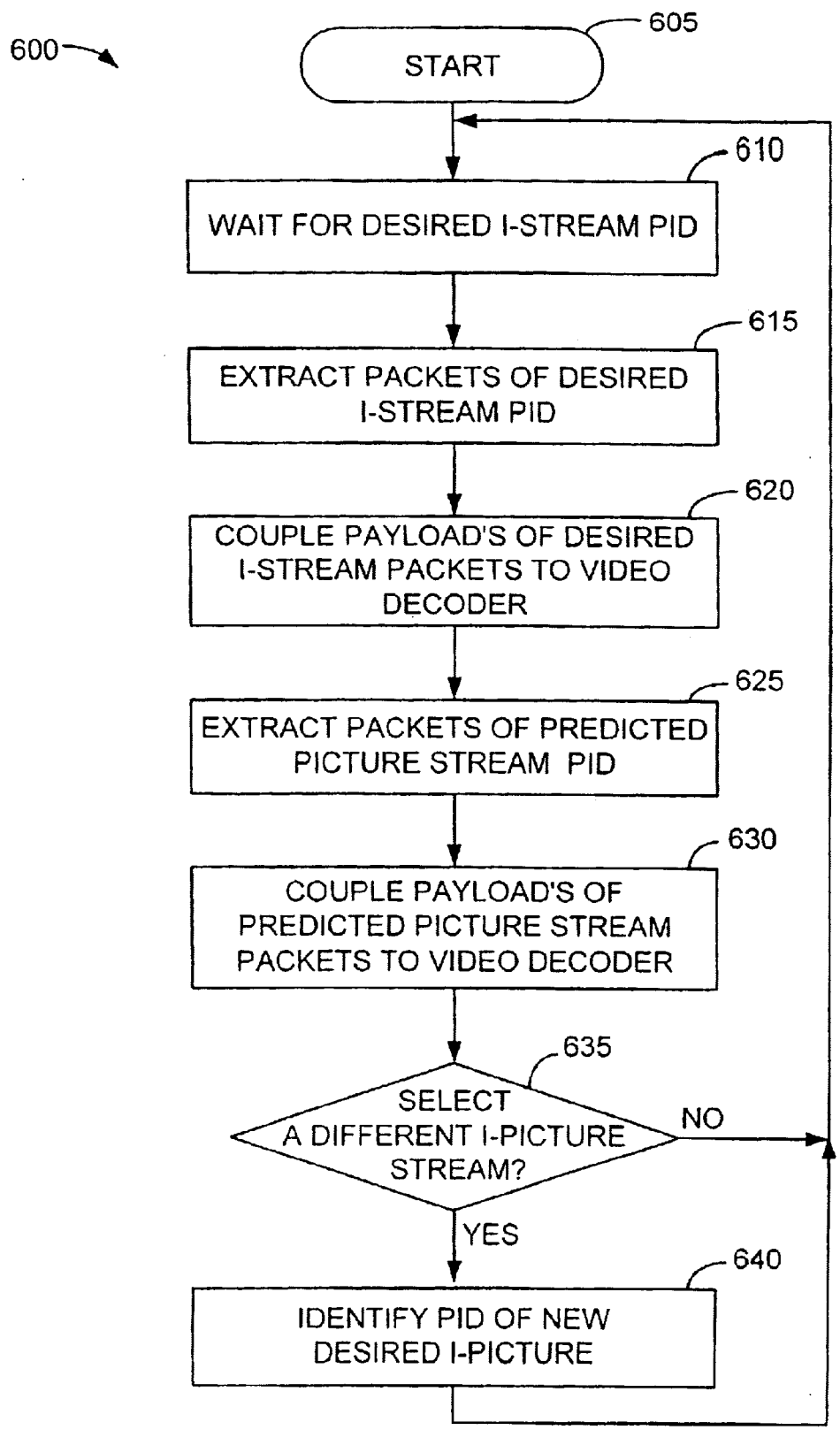
FIG. 6 depicts a flow diagram of a method for recombining and decoding streams.

FIG. 6 illustrates the details of this method, in which, it starts at step 605 and proceeds to step 610 to wait for (user) selection of an I-PID to be received. The I-PID, as the first picture of a stream's GOP, represents the stream to be received. Upon detecting a transport packet having the selected I-PID, the method 600 proceeds to step 615.

At step 615, the I-PID packets are extracted from the transport stream, including the header information and data, until the next picture start code. The header information within the first-received I-PID access unit includes sequence header, sequence extension, group start code, GOP header, picture header, and picture extension, which are known to a reader that is skilled in MPEG-1 and MPEG-2 compression standards. The header information in the next I-PID access units that belongs to the second and later GOP's includes group start code, picture start code, picture header, and extension. The method 600 then proceeds to step 620 where the payloads of the packets that includes header information related to video stream and I-picture data are coupled to the video decoder 550 as video information stream V. The method 600 then proceeds to step 625.

At step 625, the predicted picture packets PRED-PID, illustratively the PID-1 packets of fourteen predicted pictures 413 to 425 in FIG. 4 in a GOP of size fifteen, are extracted from the transport stream. At step 630, the payloads of the packets that include header information related to video stream and predicted-picture data are coupled to the video decoder 550 as video information stream V. At the end of step 630, a complete GOP, including the I-picture and the predicted-pictures, are available to the video decoder 550. As the payloads are sent to the decoder in exactly in the order in which the packets arrive at the demultiplexer, the video decoder decodes the recombined stream with no additional recombination process. The method 600 then proceeds to step 635.

At step 635 a query is made as to whether a different I-PID is requested. If the query at step 635 is answered negatively, then the method 600 proceeds to step 610 where the transport demultiplexer 530 waits for the next packets having the PID of the desired I-picture. If the query at step 635 is answered affirmatively, then the PID of the new desired I-picture is identified at step 640 and the method 600 returns to step 610.

The method 600 of FIG. 6 is used to produce a conformant MPEG video stream V by concatenating a desired I-picture and a plurality of P- and/or B-pictures forming a pre-defined GOP structure.

C2. Recombination Method 2

The second method of recombining the video stream involves the modification of the transport stream using a PID filter. A PID filter 504 can be implemented as part of the demodulator 520 of FIG. 5.

For illustrative purposes, assuming the preferred embodiment of the transport stream discussed above (multi-program transport stream with each program consisting of an I-PID, PRED-PID, audio-PID, and data-PID), any packet with a PID that matches any of the PID's within the desired program to be received have its PID modified to the lowest video PID in the program (the PID which is referenced first in the program's program mapping table (PMT)). For example, in a program, assuming that an I-PID is 50, and PRED-PID is 51. Then, the PID-filter modifies the PRED-PID as 50 and thereby, both I- and Predicted-Picture access units attain the same PID number and become a portion of a common stream.

As a result, the transport stream output from the PID filter contains a program with a single video stream, whose packets appear in the proper order to be decoded as valid MPEG video.

Note that the incoming bit stream does not necessarily contain any packets with a PID equal to the lowest video PID referenced in the programs PMT. Also note that it is possible to modify the video PID's to other PID numbers than lowest PID without changing the operation of the algorithm.

When the PID's of incoming packets are modified to match the PID's of other packets in the transport stream, the continuity counters of the merged PID's may become invalid at the merge points, due to each PID having its own continuity counter. For this reason, the discontinuity indicator in the adaptation field is set for any packets that may immediately follow a merge point. Any decoder components that check the continuity counter for continuity is required to correctly process the discontinuity indicator bit.

Figure 7:
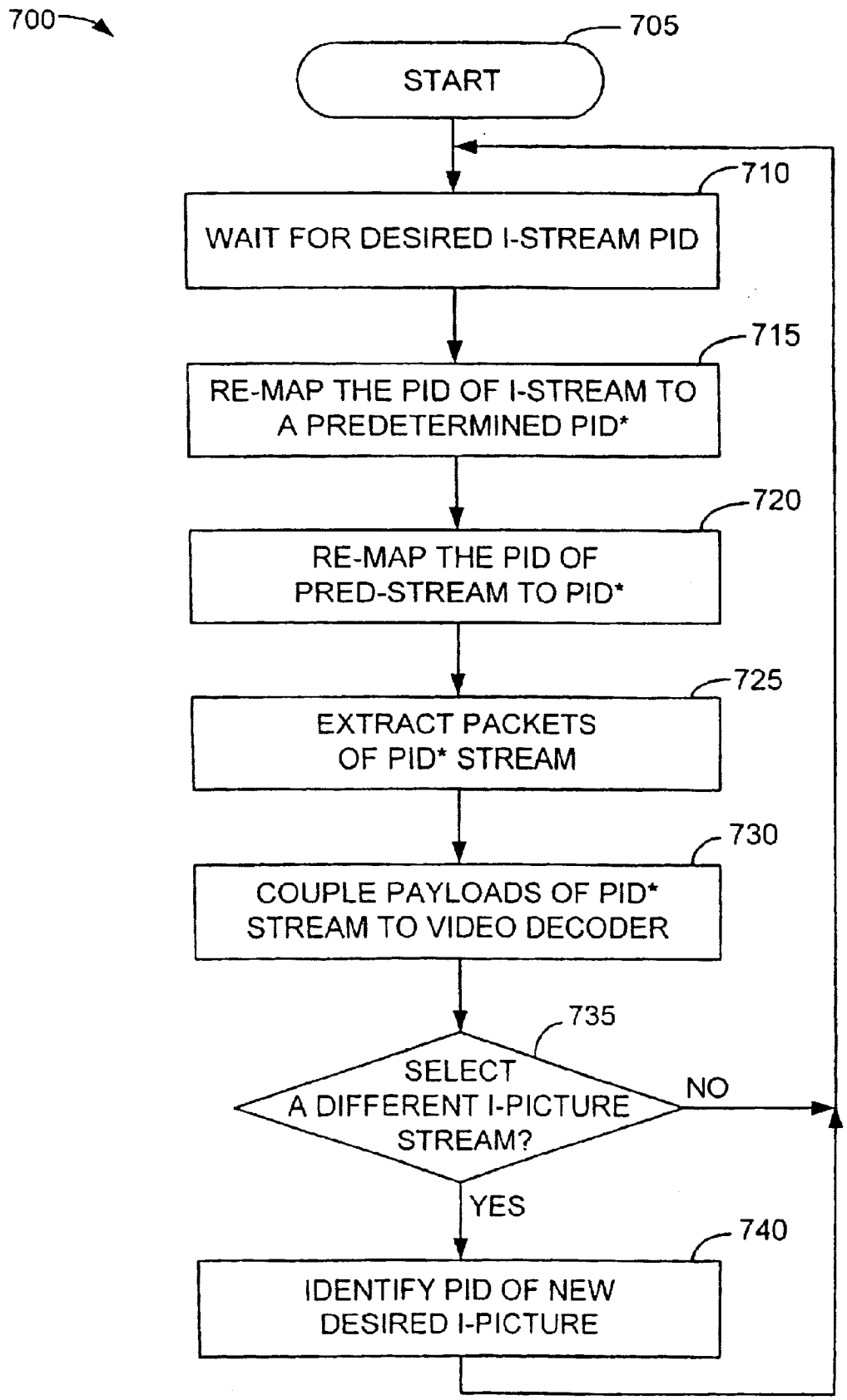
FIG. 7 depicts a flow diagram of a second method for recombining and decoding streams.

FIG. 7 illustrates the details of this method, in which, it starts at step 705 and proceeds to step 710 to wait for (user) selection of an I-PID to be received. The I-PID, as the first picture of a stream's GOP, represents the stream to be received. Upon detecting a transport packet having the selected I-PID, the method 700 proceeds to step 715.

At step 715, the PID number of I-stream is re-mapped to a predetermined number, PID*. At this step, the PID filter modifies all the PID's of the desired I-stream packets to PID*. The method then proceeds to step 720, wherein the PID number of the predicted picture stream, PRED-PID, is re-mapped to PID*. At this step, the PID filter modifies all the PID's of the PRED-PID packets to PID*. The method 700 then proceeds to step 725.

At step 725, the packets of the PID* stream is extracted from the transport stream by the demultiplexer. The method 700 then proceeds to step 730, where the payloads of the packets that includes video stream header information and I-picture and predicted picture data are coupled to the video decoder 550 as video information stream V. The method 700 then proceeds to 735.

At step 735, a query is made as to whether a different I-PID is requested. If the query at step 735 is answered negatively, then the method 700 proceeds to step 710 here the transport demultiplexer 530 waits for the next packets having the PID of the desired I-picture. If the query at step 735 is answered affirmatively, then the PID of the new desired I-picture is identified at step 740 and the method 700 returns to step 710.

The method 700 of FIG. 7 is used to produce a conformant MPEG video stream V by merging the reference stream information and predicted stream information before the demultiplexing process.

C3. Recombination Method 3

The third method accomplishes MPEG bit stream recombination by using splicing information in the adaptation field of the transport packet headers by switching between video PIDs based on splice countdown concept.

In this method, the MPEG streams signal the PID-to-PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive the other video PID. Note that a special attention to splicing syntax is required in systems where splicing is used also for other purposes.

Figure 8:
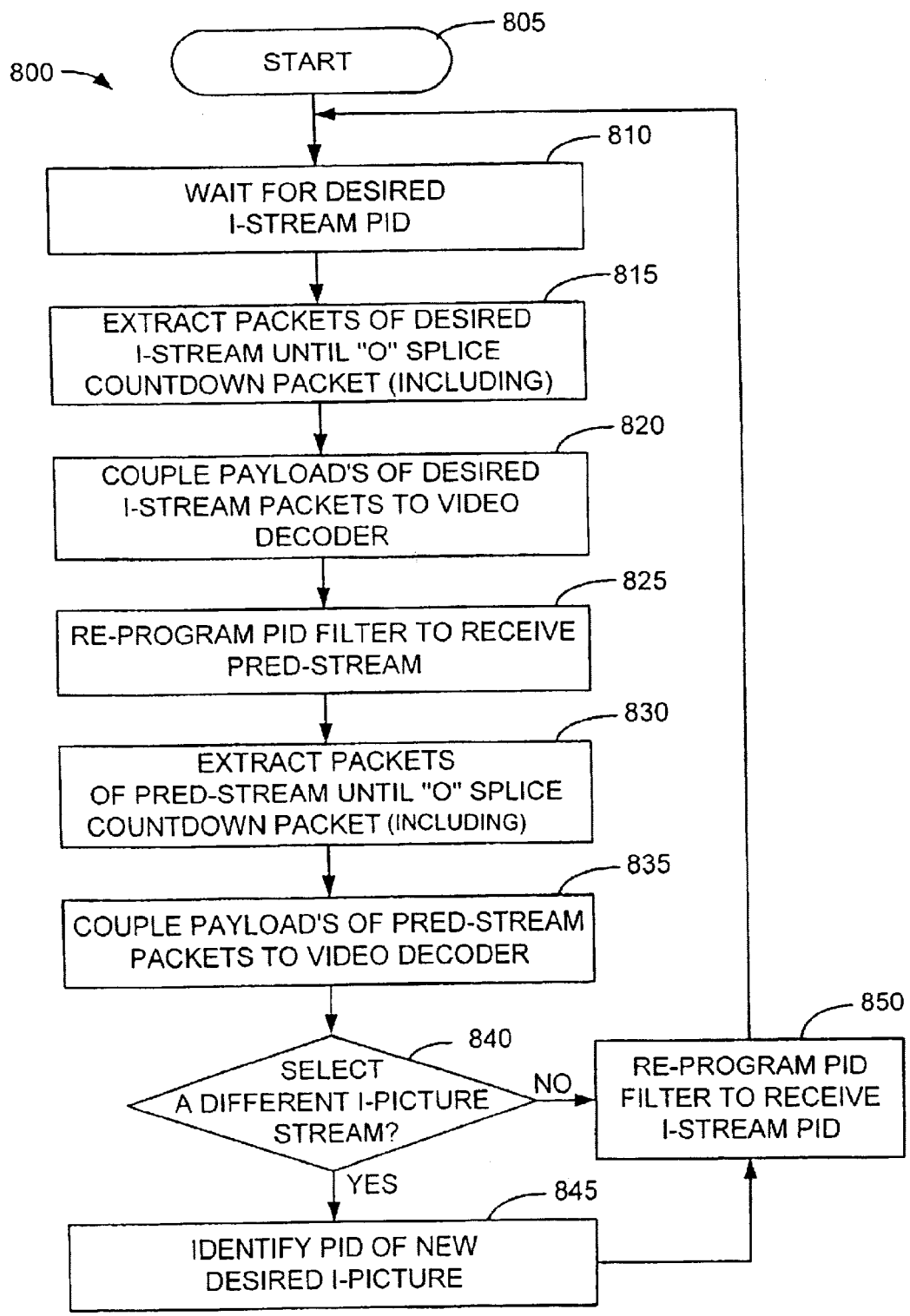
FIG. 8 depicts a flow diagram of a third method for recombining and decoding streams.

FIG. 8 illustrates the details of this method, in which, it starts at step 805 and proceeds to step 810 to wait for (user) selection of an I-PID to be received. The I-PID, as the first picture of a stream's GOP, represents the stream to be received. Upon detecting a transport packet having the selected I-PID, the method 800 proceeds to step 815.

At step 815, the I-PID packets are extracted from the transport stream until, and including, the I-PID packet with slice countdown value of zero. The method 800 then proceeds to step 820 where the payloads of the packets that includes header information related to video stream and I-picture data are coupled to the video decoder 550 as video information stream V. The method 800 then proceeds to step 825.

At step 825, the PID filter is re-programmed to receive the predicted picture packets PRED-PID. The method 800 then proceeds to 830. At step 830, the predicted stream packets, illustratively the PID-1 packets of fourteen predicted pictures 413 to 425 in FIG. 4 in a GOP of size fifteen, are extracted from the transport stream. At step 835, the payloads of the packets that include header information related to video stream and predicted-picture data are coupled to the video decoder 550 as video information stream V. At the end of step 835, a complete GOP, including the I-picture and the predicted-pictures, are available to the video decoder 550. As the payloads are sent to the decoder in exactly in the order in which the packets arrive at the demultiplexer, the video decoder decodes the recombined stream with no additional recombination process. The method 800 then proceeds to step 840.

At step 840, a query is made as to whether a different I-PID is requested. If the query at step 840 is answered negatively, then the method 800 proceeds to step 850 where the PID filter is re-programmed to receive the previous desired I-PID. If answered affirmatively, then the PID of the new desired I-picture is identified at step 845 and the method proceeds to step 850, where the PID filter is re-programmed to receive the new desired I-PID. The method then proceeds to step 845, where the transport demultiplexer 530 waits for the next packets having the PID of the desired I-picture.

The method 800 of FIG. 8 is used to produce a conformant MPEG video stream V, where the PID-to-PID switch is performed based on a slice countdown concept.

D. Example: Interactive Program Guide

D1. User Interface and Operation of IPG

Figure 9:
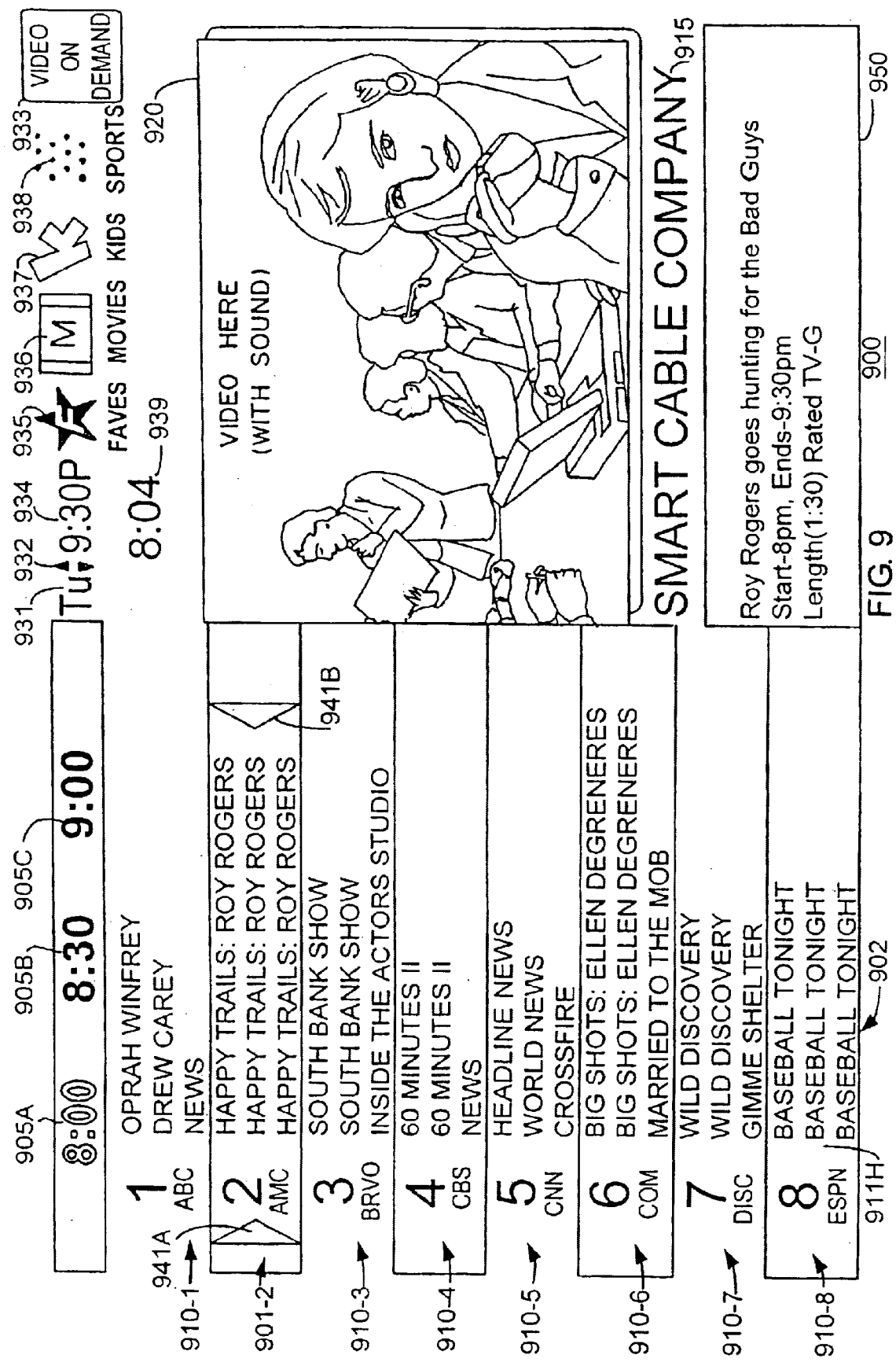
FIG. 9 depicts an example of one frame taken from a video sequence that can be encoded using the present invention.
Figure 10:
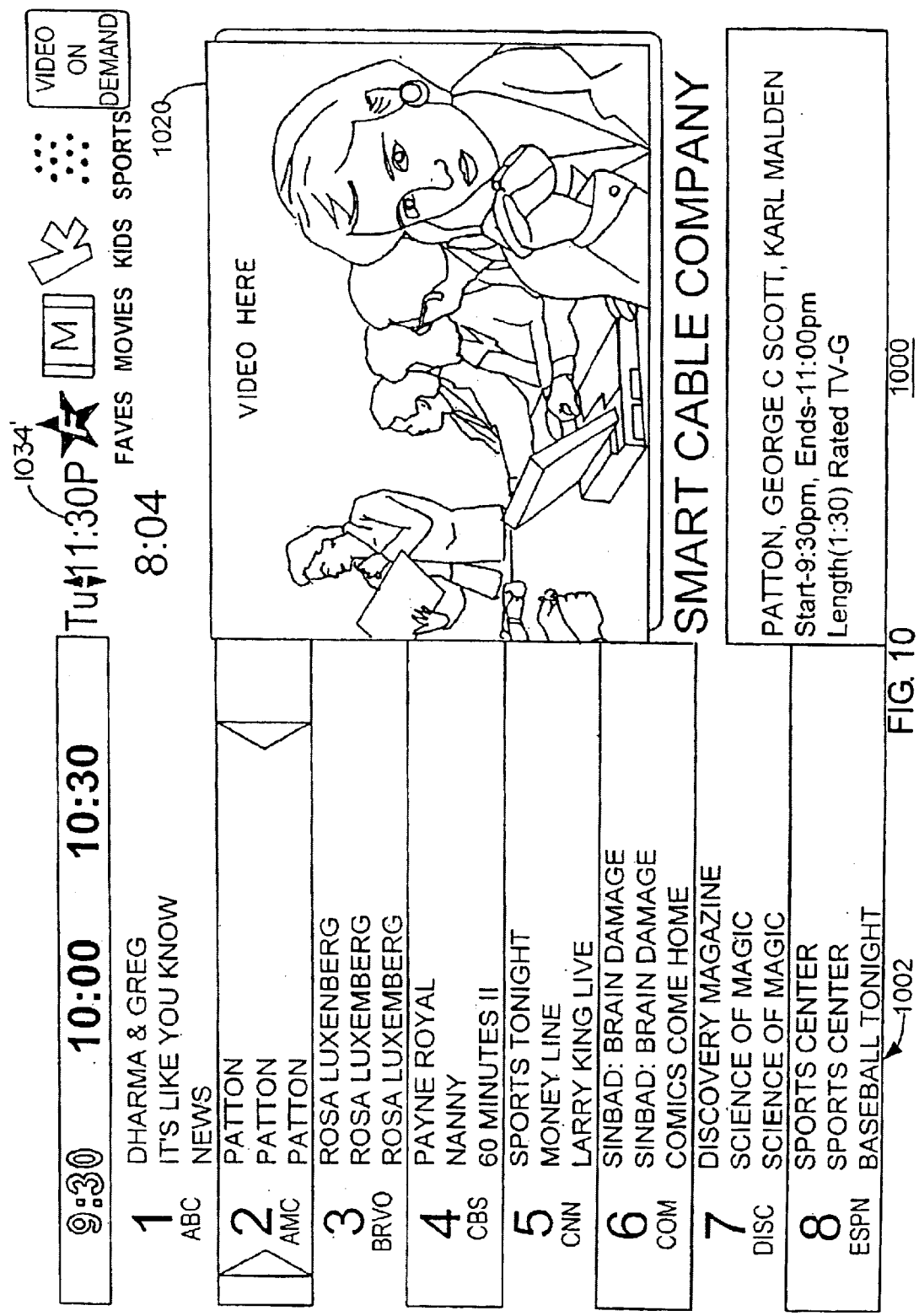
FIG. 10 depicts a second example of one frame taken from another video sequence that can be encoded using the present invention.

To illustrate the applicability of the invention to encoding IPG sequences, FIGS. 9 and 10 depict a frame from two different sequences of IPG pages 900 and 1000. The common information is everything except the programming grid 902 and 1002. The non-common information is the programming grid 902 and 1002. The programming grid 902 and 1002 changes from sequence 900 to sequence 1000. This grid changes for each channel group and each time interval. The IPG display 900 of FIG. 9 comprises a first 905A, second 905B and third 905C time slot objects, a plurality of channel content objects 910-1 through 910-8, a pair of channel indicator icons 941A, 941B, a video barker 920 (and associated audio barker), a cable system or provider logo 915, a program description region 950, a day of the week identification object 931, a time of day object 939, a next time slot icon 934, a temporal increment/decrement object 932, a "favorites" filter object 935, a "movies" filter object 936, a "kids" (i.e., juvenile) programming filter icon 937, a "sports" programming filter object 938 and a VOD programming icon 933. It should be noted that the day of the week object 931 and next time slot icon 934 may comprise independent objects (as depicted in FIG. 9) or may be considered together as parts of a combined object. Details regarding the operation of the IPG pages, their interaction with one another and with a user are described in commonly assigned U.S. patent application Ser. No. 09/359,560, filed Jul. 23, 1999, which is hereby incorporated herein by reference.

In a system, illustratively, comprising 80 channels of information, the channels are displayed in 8-channel groups having associated with them three-hour time slots. In this organization, it is necessary to provide 10 video PIDs to carry the present-time channel/time/title information, one audio PID to carry the audio barker and/or a data PID (or other data transport method) to carry the program description data, overlay data and the like. To broadcast program information up to 24 hours in advance, it is necessary to provide 160 (i.e., 10*24/1.5) video PIDS, along with one audio and, optionally, one or more data PIDs. The amount of time provided for in broadcast video PIDs for the given channel groups comprises the time depth of the program guide, while the number of channels available through the guide (compared to the number of channels in the system) provides the channel depth of the program guide. In a system providing only half of the available channels via broadcast video PIDs, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours.

The video streams representing the IPG are carried in a single transport stream or multiple transport streams, within the form of a single or multi-programs as discussed previously in this invention. A user desiring to view the next 1.5 hour time interval (e.g., 9:30–11:00) may activate a "scroll right" object (or move the joystick to the right when a program within program grid 902 occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

It is important to note that each extracted video stream is generally associated with a common audio stream. Thus, the video/audio barker function of the program guide is continuously provided, regardless of the selected video stream. Also note that the teachings of the invention are equally applicable to systems and user interfaces that employs multiple audio streams.

Similarly, a user interaction resulting in a prior time interval or a different set of channels results in the retrieval and presentation of a related video stream. If the related video stream is not part of the broadcast video streams, then a pointcast session is initiated. For this purpose, the STT sends a request to the head end via the back channel requesting a particular stream. The head end then processes the request, retrieves the related stream from the information server, incorporates the stream within a transport stream as a video PID (preferably, the transport stream currently being tuned/selected by the STT) and informs the STT which PID should be received, and from which transport stream it should be demultiplexed. The STT then retrieves the related video PID. In the case of the video PID being within a different transport stream, the STT first demultiplexes the corresponding transport stream (possibly tuning a different QAM stream within the forward channel).

Upon completion of the viewing of the desired stream, the STT indicates to the head end that it no longer needs the stream, whereupon the head end tears down the pointcast session. The viewer is then returned to the broadcast stream from which the pointcast session was launched.

D2. Compressing IPG Pages

Various data structures can be used to represent data for the guide and video regions shown in each of FIGS. 9 and 10. For an interactive information distribution system, program guide data may be processed and sent over a number of elementary streams. Each elementary stream carries a video stream comprised of a sequence of pictures. Each picture can represent a particular IPG user interface page (i.e., a particular IPG screen) having a particular format, for example, such as that shown in FIGS. 9 and 10. Each picture can thus include a combination of textual and video information (e.g., text on the left side of the picture and video on the right side). Depending on the particular implementation and operation of the interactive information distribution system, some of the pictures may include common (i.e., redundant) information. The invention provides a number of efficient data structure models for use in a number of interactive program guide applications to reduce the amount of data used to represent a group of video sequences having some common textual and/or video information.

Figure 11:
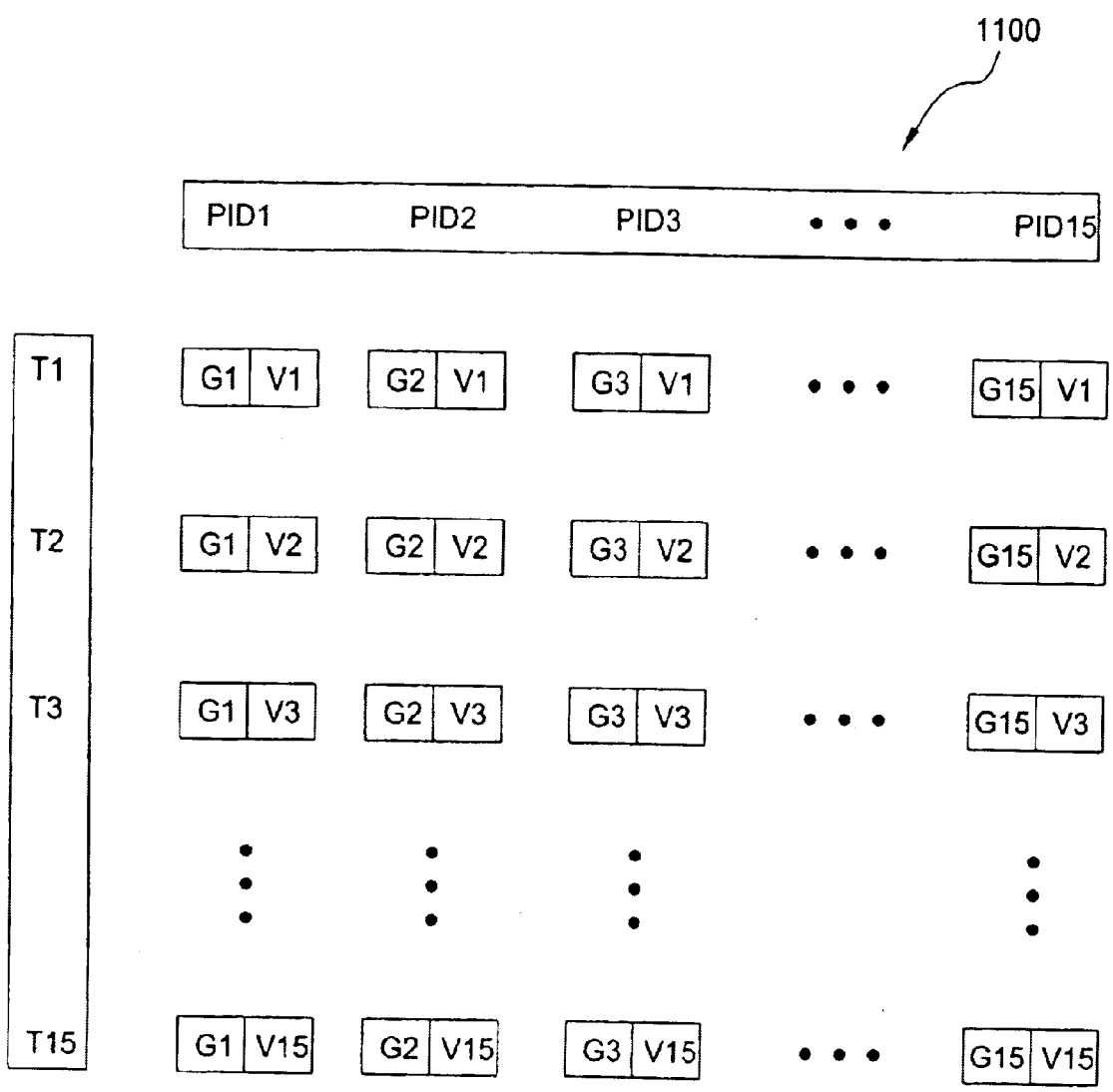
FIG. 11 depicts a matrix representation of program guide data using time and packet ID (PID) coordinates.

FIG. 11 depicts a matrix representation of program guide data using time and packet ID (PID) coordinates. In this representation, the horizontal axis represents the PID number for each of the video streams transmitted, and the vertical axis represents time indices for the video streams. In this specific example, 15 video streams are generated and labeled as PID1 through PID15. The 15 video streams can be generated, for example, using 15 video encoders 220 in FIG. 2 and/or retrieved from a memory. Each video stream is composed of a time sequence of pictures. In this specific example, 15 time indices are shown on the vertical axis and labeled as t1 through t15. The 5 pictures for each video sequence forms a group of picture (GOP) for that video sequence.

As shown in FIG. 11, the program guide data is represented using a matrix 1100 that is a two-dimensional array of elements. In the embodiment shown in FIG. 11, each element of matrix 1100 includes two regions (or portions)—a guide portion and a video portion. For example, the element in the first column of the first row represents the guide portion (g1) and video portion (v1) of PID1 sequence at time index t1, the element in the second column of the first row represents the guide portion (g2) and video portion (v1) of PID2 sequence at time index t1, and so on.

Matrix 1100 in FIG. 11 is illustratively shown to include 15 PIDs for 15 video streams, with each PID including a GOP having 15 pictures. However, matrix 1100 can be designed to have any defined dimension (i.e., an M×N dimension, where M and N can each be any integer one or greater).

In the specific example shown FIG. 11, the guide portion for each PID sequence is different but the video portion is common for all PID sequences. Thus, the guide data index (g1, g2, . . . , g15) increases in number, corresponding to the PID, as the matrix is traversed across the horizontal axis. Because the video portion is common for all PIDs, the video data index (e.g., v1) remains constant as the matrix is traversed in the horizontal axis. In this example, the guide portion is static over the time indices represented in FIG. 11 but the video portion changes over time (e.g., for moving picture). Thus, the guide data index remains constant as the matrix is traversed in the vertical (temporal) axis, but the video data index changes with the time index.

As noted above, each of the 15 video sequences in FIG. 11 includes 15 pictures that can be coded as a group of picture. For example, the video sequence for PID1 can be encoded as a GOP comprised of the 15 coded pictures: I1, B1, B1, P1, B1, B1, P1, B1, B1, P1, B1, B1, P1, B1, and B1. The video sequences for PID2 through PID15 can be similarly coded and transmitted. At the STT, if a user want to view a particular channel (i.e., a particular PID sequence), the coded pictures for that channel is decoded and displayed.

Figure 12:
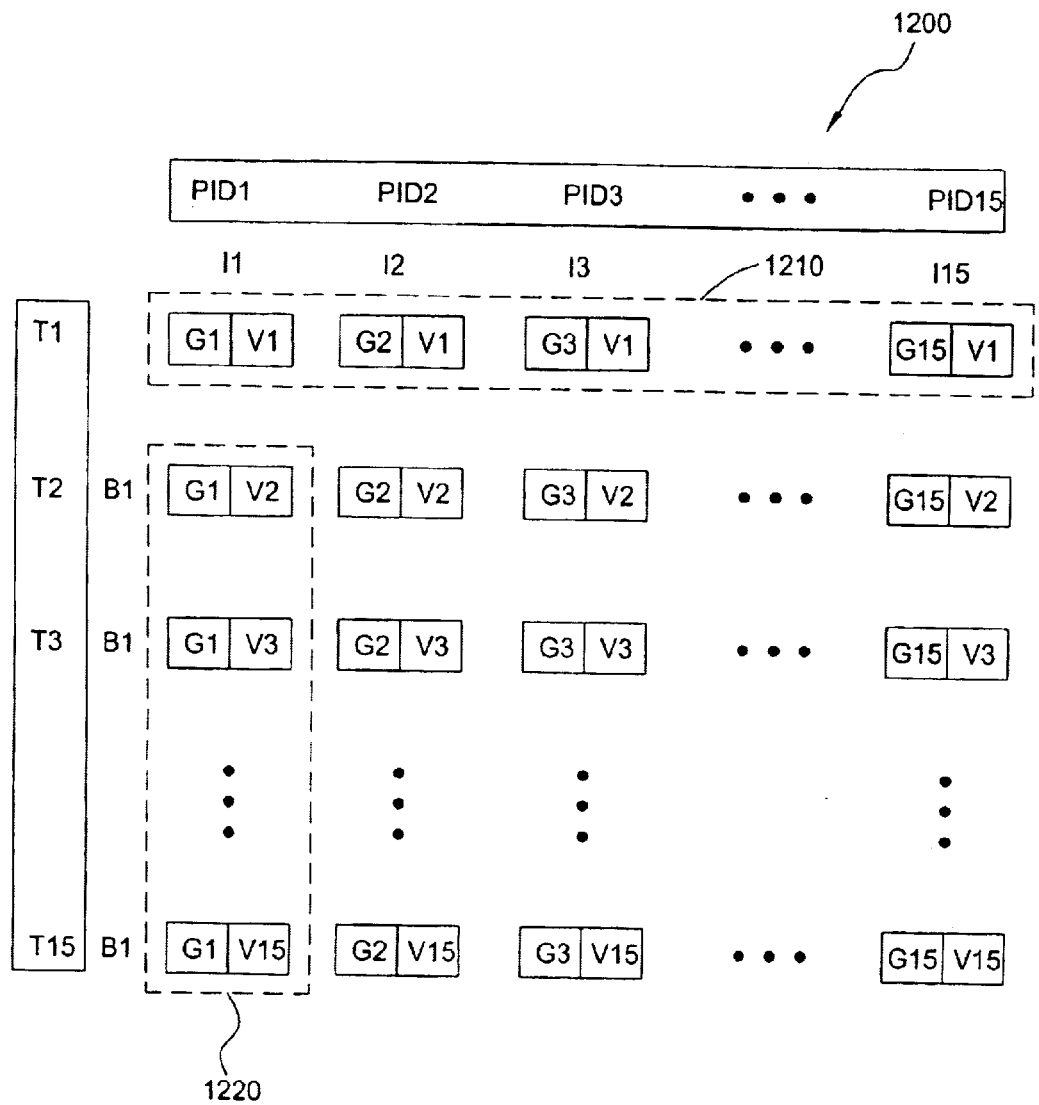
FIGS. 12 through 14 depict an embodiment of three data structures that can be used to reduce the amount of data to be coded and delivered to a set top terminal (STT) for the program data matrix shown in FIG. 11.

FIG. 12 depicts an embodiment of a data structure 1200 that can be used to reduce the amount of data to be coded and delivered to a set top terminal (STT) for matrix 1100 shown in FIG. 11. Data structure 1200 includes a first element grouping 1210 and a second element grouping 1220 that can be used to fully represent the data in matrix 1100. In an embodiment, first element grouping 1210 includes 15 elements for the 15 I-PIDs for PID1 through PID15. Each I-PID includes a single I frame at time index t1. The I-PID for PID1 includes the guide portion (g1) and video portion (v1), the I-PID for PID2 includes the guide portion (g2) and video portion (v1), and so on. In an embodiment, second element grouping 1220 includes 14 elements for 14 non-I frames for one of the PIDs (e.g., PID1) and is also referred to as a "base PID". The base PID includes the remaining 14 pictures of the GOP for the selected PID corresponding to time indices t2 through t15. For example, if PID1 is the selected PID as shown in FIG. 12, the base PID may comprise the following picture sequence: B1, B1, P1, B1, B1, P1, B1, B1, P1, B1, B1, P1, B1, and B1.

If a user wants to view the guide data for a particular group of channels, a demultiplexer at the STT switches to the related I-PID and the I frame for the PID is decoded. For each subsequent time index, the P or B frame in the base PID is decoded (using the decoded I frame for the selected PID) and processed to construct the video portion. The constructed video portion is then extracted and combined with the guide portion extracted from the decoded I frame of the selected PID to generate the picture for that time index. For example, to generate the picture for PID2 at time index t2, the B1 picture in the base PID at time index t2 is decoded and the video portion (v2) is extracted. The I frame for PID2 at time index t1 is also decoded, and the guide portion (g2) is also extracted. To generate the picture for PID2 at time index t2, the extracted guide portion (g2) is combined with the extracted video portion (v2). Subsequent pictures for this PID can be generated in similar manner.

Using data structure 1200 shown in FIG. 12, instead of processing all 225 elements for matrix 1100, the number of elements to be coded and delivered reduces to 29. This reduction in transmitted data is achieved without loss in information. The reduction in the required bit rate can be computed for a specific example in which 40 percent of a GOP's bits is assigned to an I frame and the remaining 60 percent is assigned to the 14 remaining P and B frames (e.g., the base PID). Data structure 1200 can then reduce the relative bit rate from 1500 (i.e., 15 I frames×40+15 base PID×60=1500) down to 660 (i.e., 15 I frames×40+1 base PID×60=660). The reduction in relative bit rate can be used to transmit more video sequences (i.e., more GOPs) with the same common video portion. For example, for the same relative bit rate of 1500, 36 PIDs can be transmitted using data structure 1200 (i.e., 36 I frames×40+1 base PID×60= 1500).

Figure 13:
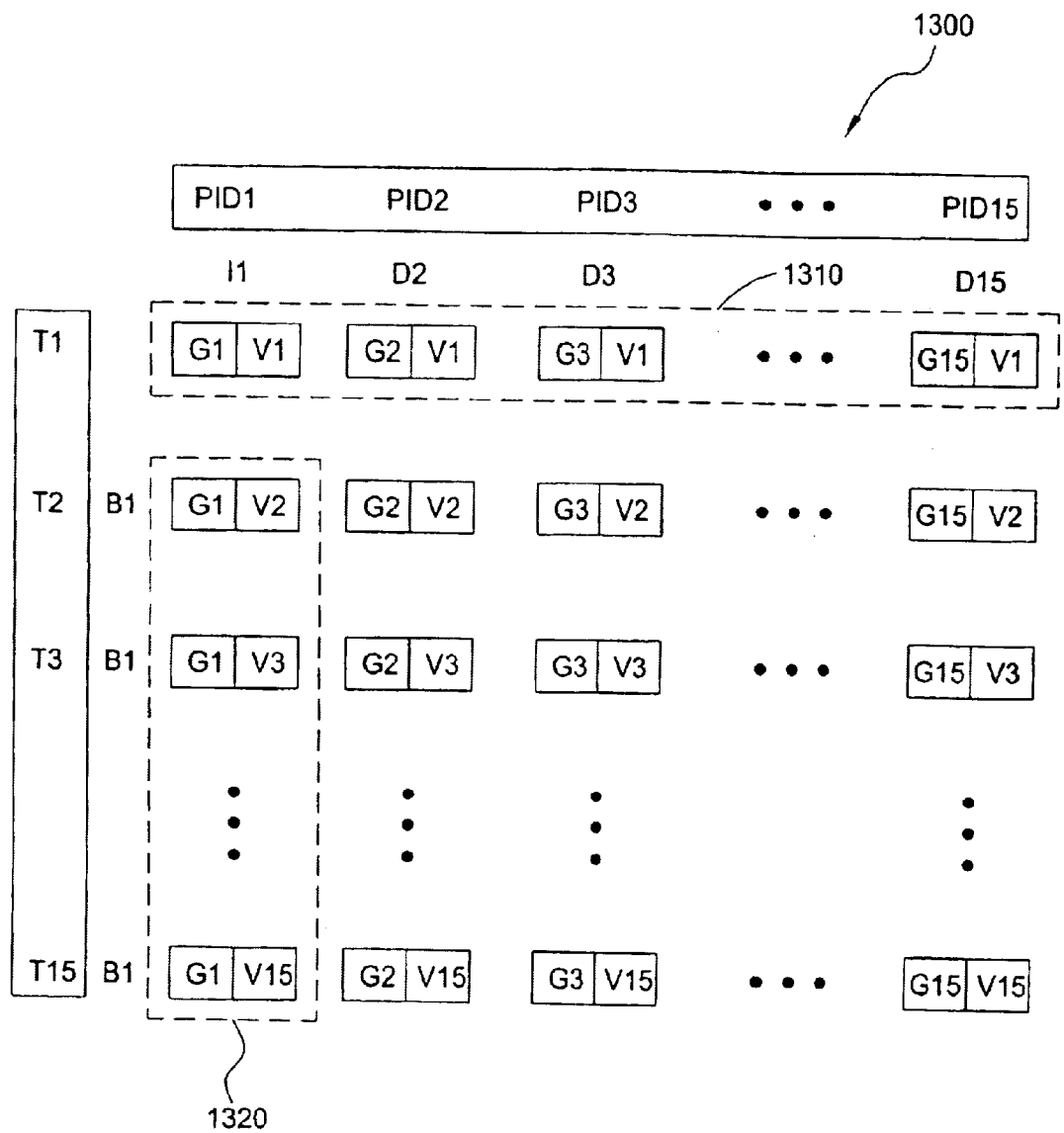

FIG. 13 depicts an embodiment of another data structure 1300 that can be used to further reduce the amount of data to be coded and delivered to a set top terminal for matrix 1100 shown in FIG. 11. As shown in FIG. 13, the 15 elements at time index t1 include a common video portion (v1). The video portion of these elements can thus be efficiently encoded as difference frames to further reduce the amount of data to be transmitted.

Data structure 1300 includes a first element grouping 1310 and a second element grouping 1320 that can be used to fully represent the data in matrix 1100. First element grouping 1310 includes 15 elements for the 15 I-PIDs for PID1 through PID15. However, instead of encoding each I-PID at time index t1 as an I frame (as in data structure 1200), a reference I frame is encoded for one of the I-PID, and each of the other I-PID frames is encoded as a difference frame based, in part, on the reference I frame. In the example shown in FIG. 13, the I-PID for PID1 is encoded as a reference I frame (denoted as I1) and the I-PIDs for PID2 through PID15 are encoded as difference frames D2 through D15, respectively. Any of the I-PIDs can be encoded as the reference I frame, and this is within the scope of the invention. Also, two or more of the I-PIDs can be encoded as reference I frames, and this is also within the scope of the invention.

Similar to data structure 1200, second element grouping 1320 in data structure 1300 includes 14 elements for 14 non-I frames for one of the PIDs and is also referred to as a base PID. The base PID is generated for the video stream having its I-PID encoded as the reference I frame, which is PID1 in this example. The non-I frames are encoded based, in part, on the reference I frame and include the last 14 pictures of the GOP for PID1 corresponding to time indices t2 through t15 (e.g., B1, B1, P1, B1, B1, P1, B1, B1, P1, B1, B1, P1, B1, and B1).

The encoding for data structure 1300 can be performed (e.g., at the head end) as follows. First, one of the I-PIDs is selected as the reference I-PID (e.g., PID1 in this example). The selected I-PID is encoded and then decoded. The resultant decoded I frame is used as a reference frame to calculate the difference frames for the remaining I-PIDs (e.g., D2 through D15 for PID2 through PID15, respectively). Since the video portion (v1) does not change in the horizontal axis (i.e., along the PID dimension), only the guide portion (g1) of the decoded PID frame is used to create the difference frames. For example, the difference frame for PID2 is created by encoding the difference in the guide portion (i.e., g2−decoded g1), and then skipping the macroblocks in the video portion. The difference frames can be encoded using the mechanisms described below.

The decoding for data structure 1300 can be performed (e.g., at the STT) as follows. If a user wants to view a particular group of channels (e.g., PID2), the demultiplexer at the STT switches to the related I-PID. If the selected I-PID is not the reference PID, the reference I-PID (e.g., I1 for PID1) is identified and passed to the (MPEG-2) decoder along with the difference frame for the selected PID (e.g., D2 for PID2). The difference frame is decoded using a decoding scheme complementary to the encoding scheme used to generate the difference frame. The decoded difference frame is then combined with the decoded reference I frame to generate the decoded frame for the selected PID.

The base PID can be decoded in various ways. In one embodiment, the decoded frame for the selected PID is used as a reference frame to start the decoding process for the base PID. In another embodiment, the decoded reference I frame is used as a reference frame to start the decoding process for the video portion of the base PID, possibly in parallel with the decoding of the difference frame for the selected PID. The decoded video portions of the base PID are then combined with the guide portion of the decoded difference frame for PID2 to generate the decoded pictures at time indices t2 through t15.

Using data structure 1300 shown in FIG. 13, instead of coding and transmitting the 15 I-PIDs as I frames, only one I-PID is coded as a reference I frame and the remaining 14 I-PIDs are coded as difference frames. This reduction in transmitted data is achieved with minimal loss (if any) in information. Since the 14 difference frames typically contain only the text difference and no motion video, a relative bit rate number of 50 may be assigned to these 14 difference frames. The reduction in the required bit rate can be computed using the above bit rate number assignment (i.e., 40 for an I frame, 60 for the base PID, and 50 for the 14 difference frames). The relative bit rate can be reduced from 660 for data structure 1200 down to 150 for data structure 1300 (i.e., 1 I frames×40+1 set of difference frames×50+1 base PID×60=150).

Figure 14:
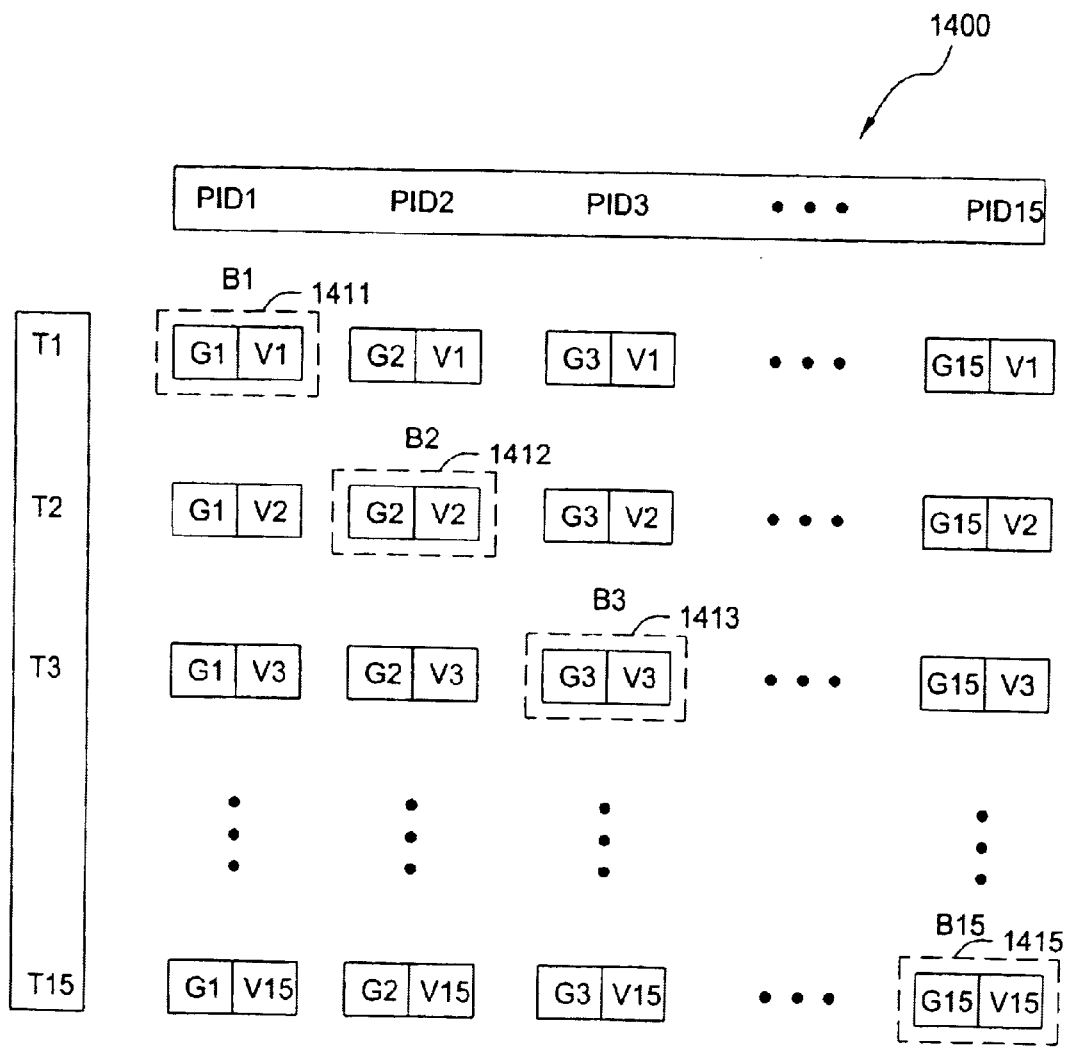

FIG. 14 depicts an embodiment of yet another data structure 1400 that can be used to still further reduce the amount of data to be coded and delivered to a set top terminal for matrix 1100 shown in FIG. 11. As shown in FIG. 14, the 15 elements for each time index include a common video portion (e.g., v1 at time index t1). Also, for matrix 1100, the 15 pictures for each PID sequence include a common guide portion (e.g., g1 for PID1). Thus, the 15 guide portions (g1 through g15 for PID1 through PID15, respectively) and the 15 video portions (v1 through v15 at time indices t1 through t15, respectively) can be fully represented by encoding and transmitting a single copy of each of these guide and video portions. This can be achieved by processing the diagonal elements of matrix 1100.

Data structure 1400 includes a set of elements 1411 through 1425 that can be used to fully represent the data in matrix 1100. As shown in FIG. 14, in the diagonal path, both guide portion and video portion change. Since the sequence of pictures can involve motion changes in the video portion, the sequence can be encoded as a video sequence using an MPEG-2 encoder in the GOP format (e.g., I1, B2, B3, P4, B5, B6, P7, B8, B9, P10, B11, B12, P13, B14, and B15).

In the example shown in FIG. 14, the first element 1411 at time index t1 includes the I-PID for PID1, which is encoded as a reference I frame. The second element 1412 at time index t2 includes the picture for PID2, which is encoded as a B frame based, in part, on the reference I frame. The third element 1413 at time index t3 includes the picture for PID3, which is also encoded as a B frame. Although not shown in FIG. 14, the fourth element 1414 at time index t4 includes the picture for PID4, which is encoded as a P frame based on the reference I frame. The processing continues in similar manner for the remaining time indices and PIDs. The sequence of pictures generated for matrix 1100 can be represented as a GOP comprised of I1 B1, B2, B3, P4, . . . , and B15.

FIG. 14 shows the encoding of the diagonal elements in matrix 1100 to process the unduplicated guide and video portions. However, other sets of elements in matrix 1100 can also be selected for processing. For example, the I-PID for any one of the 15 PIDs can be selected for processing as the reference I frame. Generally, any set of elements in matrix 1100 can be processed as long as at least one copy of the unduplicated guide and video portions is selected, processed, and transmitted. Thus, if the number of PIDs does not match the number of time units in the matrix (i.e., if the matrix is not square), multiple pictures may be processed for a particular time index (if the number of PIDs exceeds the number of time units) or multiple pictures of a particular PID may be processed (e.g., if the number of time units exceeds the number of PIDs).

The decoding for data structure 1400 can be performed (e.g., at the STT) by switching activity between different PIDs at different time indices. Initially, the received (diagonal) GOP is demultiplexed and decoded to recover the video and guide portions. If a particular PID is selected for viewing, the guide portion corresponding to the selected PID is retrieved and combined with the video portion for each time index. For example, to view PID2 at the STT, the video portion (v1) from PID1 at time index t1 is extracted and combined with the guide portion (g2) extracted from PID2 at time index t2 to generate the decoded picture for PID2 at time index t1. At time index t2, the decoded picture for PID2 is displayed. At time index t3, the video portion (v3) from PID3 at time index t3 is extracted and combined with the previously extracted guide portion (g2) to generate the decoded picture for PID2 at time index t3. The decoding process continues in similar manner for the remaining pictures. As can be seen from FIG. 14, any element in matrix 1100 can be constructed from the diagonal elements by mapping and combining the decoded portions from the proper row and column indices.

The reduction in the required bit rate can be computed using the above bit rate number assignment (i.e., 40 for an I frame and 60 for the base PID). The relative bit rate can be reduced from 150 for data structure 1300 down to 100 for data structure 1400 (i.e., 1 I frames×40+1 base PID×60=100).

In matrix 1100 shown in FIGS. 11 through 14, the same video sequence is transmitted for all 15 PIDs. This can be used to show different program guides with a common video. Another matrix representation can be used to convey program guide data with different contexts (i.e., different videos). This matrix representation can be used, for example, to provide a preview clip of a selected program offered on a selected channel.

Figure 15:
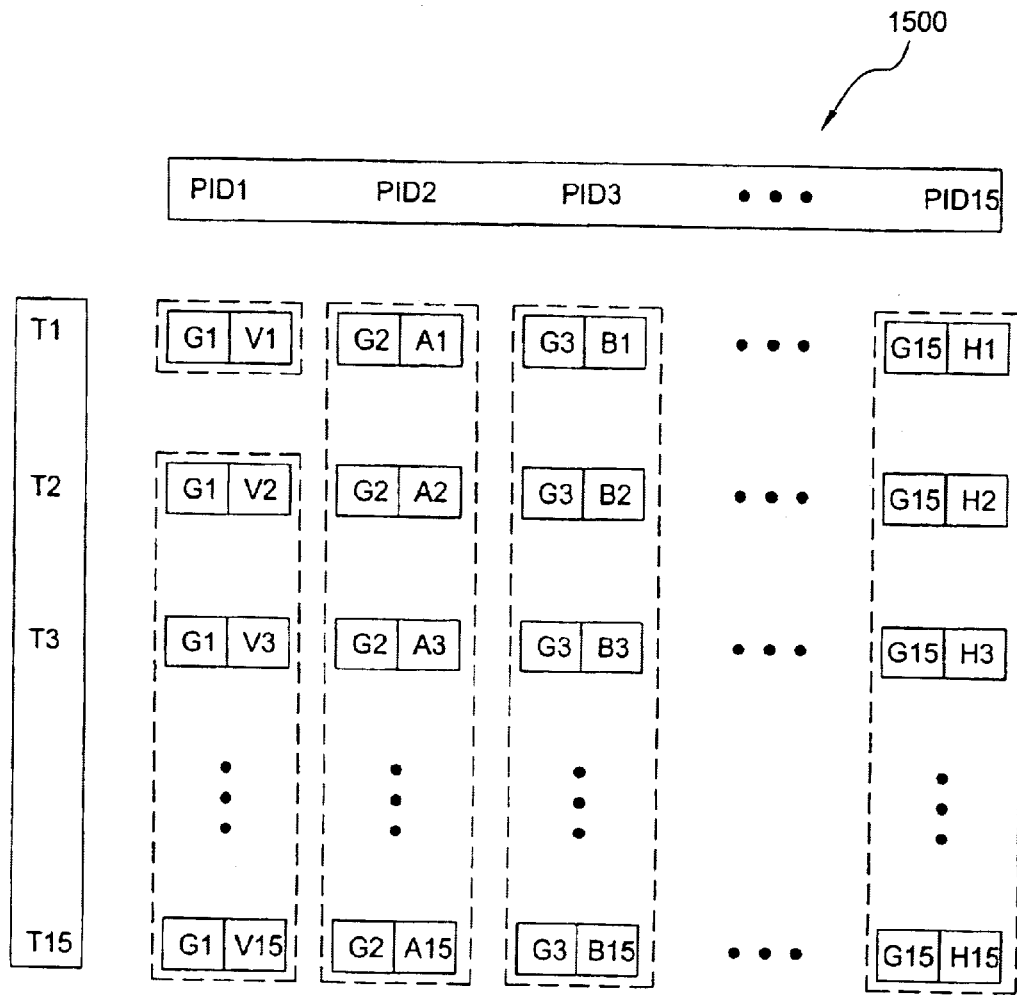
FIG. 15 depicts a matrix of program guide data configured to present a different video for each PID.

FIG. 15 depicts a matrix 1500 of program guide data configured to present a different video for each PID. Matrix 1500 can be used to support, for example, look-ahead time selection in which a preview clip is provided for each PID. In this case, the guide portion in the PIDs is the same (e.g., a list of eight channels) and the video portion varies from PID to PID. Thus, rather than carrying a number of channels with the same video sequence as shown in matrix 1100, each PID in matrix 1500 carries its own preview video clip for its channel.

For matrix 1500, the guide data (represented as g1 in FIG. 15) can be encoded along with the first video of a reference PID as an I frame. Each of the remaining non-reference PIDs can be encoded independently as a different video sequence (e.g., a1, a2, a3, and so on). However, since the guide portion (g1) is the same for the PIDs, it can be omitted from processing and transmission.

Specifically, at time index t1, the guide and video portions for one of the PIDs (e.g., g1, v1 for PID1) can be encoded as the reference I frame. Subsequently, the video portions of the remaining pictures within the GOP for this PID can be encoded based on the reference I frame. The video portions at time index t1 for each of the remaining PIDs (e.g., PID2 through PID8) can be encoded as an I picture. Alternatively, the video portion at time index t1 for each remaining PID can be coded as a P picture based on the reference I picture.

For example, the guide portion (g1) and video portion (v1) for PID1 at time index t1 can be encoded as the reference I picture. For the next picture of PID1 at time index t2, the video portion (v2) is extracted and encoded as a B picture based, in part, on the video portion (v1) at time index t1. The guide portion (g1) at time t2 can be omitted from processing. The encoding for PID1 continues in similar manner for the remaining pictures at time indices t3 through t15. For PID2, the video portion (a1) at time index t1 can be coded as an I picture, and the video portions (a2, a3, and so on) at time indices t2 through t15 can be encoded as P and B pictures based on the I picture generated for PID2 at time index t1. Alternatively, the video portion (a1) for PID2 at time index t1 can be encoded as a difference picture (i.e., as difference of a1–v1).

The decoding for data structure 1500 can be performed (e.g., at the STT) as follows. Initially, the reference I picture is constructed and stored. If a particular PID is selected for viewing, the video sequence for that PID is constructed and combined with the previously constructed and stored guide portion. The decoded video sequence is thus presented along with the guide portion available in the decoded reference picture.

The decoding of the video portions for the selected PID is dependent on, and complementary to, the encoding scheme used to encode the PIDs. If each of the PIDs at time index t1 is encoded as an I picture, then the I picture for the selected PID can be decoded and used as the reference for decoding the video portions for the remaining time indices t2 through t15. Alternatively, if the selected PID at time index t1 is encoded as a difference frame, the difference picture can be decoded and combined with the decoded reference I picture. For example, if PID2 is to be constructed, then the decoder first constructs the video portion (a1) by either: (1) decoding the video portion (a1), if it has been encoded as an I picture, or (2) adding the decoded video portion (v1) to the decoded reference I picture (v1), if it has been encoded as a difference picture (i.e., a1—decoded (v1)). Subsequent video portions (a2) through (a15) for PID2 can then be decoded based on the decoded video portion (a1).

Various encoding mechanisms can be used to encode the pictures in FIGS. 12 through 15. These encoding mechanisms can be adopted or tailored for the application for which they are used. For example, a simplified encoder can be used to encode the difference frames in FIG. 13 since the difference in the guide portion is typically text based. In one embodiment, a text encoder is used to create encoded guide data. In another embodiment, an MPEG-2 encoding scheme that is adopted for text encoding can be employed. In yet another embodiment, the same encoding mechanism that is used to generate the base PID can be used. Other encoding schemes can also be used and are within the scope of the invention.

The encoding can be achieved by various types of encoder. For example, the guide and video portions can each be encoded by software or hardware (e.g., MPEG-2) encoder. Other types of encoder, or combinations thereof, can also be used and are within the scope of the invention.

The encoding of the pictures described above can be achieved using picture-based or slice-based encoding. In picture-based encoding, which is commonly used by MPEG-2 encoders, an entire picture is processed to generate the coded data that is then transmitted. In slice-based encoding, "slices" of the picture is processed to generate the coded data. Each slice is composed of a number of macroblocks and has a length that may be defined. Slice-based encoding is relatively more complex to implement than picture-based encoding. However, it provides additional flexibility in the encoding process, and is well suited for encoding both text and video. For slice-based encoding, a mechanism is used to properly splice the slices at the decoder to construct the pictures.

For each of the data structures described above, the matrix may be dynamically updated at the source (e.g., the head end) and delivered to the destination (e.g., the STT) by suitable means. For example, the data for the matrix can be sent as part of private data, auxiliary data, or some other means. A chosen matrix can be sent as indices to the set top box. In a specific embodiment, the matrix being used is pre-wired (pre-known) to the set top terminal and only a signaling mechanism is used to signal which matrix is being used.

The index matrix representation described above with respect to FIGS. 11 through 15 may be used to represent program guide data with different contexts such broadcast, narrowcast, pointcast, shared pointcast, and the like. The data structures and various aspects of the invention described above can be applied to any interactive system design application, in addition to IPG delivery, that contains redundant data in the original content.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A data structure for representing program data that includes a plurality of streams, wherein each stream comprises a group of pictures (GOP) having a first picture and one or more remaining pictures, the data structure comprising:

a first set of one or more elements for representing data for the first pictures in the plurality of GOPs, wherein each of at least one element in the first set represents data for at least a portion of the first picture of a respective GOP encoded as a reference I picture, and wherein each of remaining elements in the first set represents data for at least a portion of the first picture of a respective remaining GOP encoded as either a difference picture or a P picture; and a second set of one or more elements for representing data for the one or more remaining pictures in the plurality of GOPs, wherein each element in the second set represents data for at least a portion of a particular remaining picture in one of the plurality of GOPs encoded as either a P picture or a B picture, and wherein each of the plurality of streams is represented by one or more elements in the first set and one or more elements in the second set.

2. The data structure of claim 1, wherein the first set includes a plurality of elements, one element for each of the plurality of GOPs.

3. The data structure of claim 2, wherein each of the elements in the first set represents data of the first picture of a respective GOP encoded as a reference I picture.

4. The data structure of claim 2, wherein one element in the first set represents data of the first picture of a particular GOP encoded as a reference I picture, and wherein each remaining element in the first set represents data of the first picture of a respective remaining GOP encoded as a difference picture.

5. The data structure of claim 1, wherein the first set includes a single element for representing data for the first picture of one of the plurality of GOPs.

6. The data structure of claim 1, wherein the second set includes a plurality of elements, one element for each of the remaining pictures in one particular GOP.

7. The data structure of claim 6, wherein the elements in the second set represent data for the particular GOP.

8. The data structure of claim 6, wherein each of the elements in the second set represents data for a respective remaining picture of the particular GOP, which is encoded as either a P picture or a B picture.

9. The data structure of claim 6, wherein the elements in the second set represents data for at least one remaining picture of each of the plurality of GOPs.

10. The data structure of claim 1, wherein each picture of the plurality of GOPs includes
 a first portion indicative of textual information, and
 a second portion indicative of video information.

11. The data structure of claim 10, wherein the first and remaining pictures of each GOP share a common first portion.

12. The data structure of claim 10, wherein the first pictures of the plurality of GOPs share a common second portion.

13. The data structure of claim 10, wherein the first portion is encoded using a text encoder or an encoder adapted for encoding text.

14. The data structure of claim 10, wherein the first portion includes program guide information for one or more groups of channels.

15. The data structure of claim 10, wherein the second portion includes moving video.

16. The data structure of claim 1, wherein the plurality of GOPs include a plurality of video sequences, and wherein each video sequence occupies at least a portion of the GOP that includes the video sequence.

17. The data structure of claim 16, wherein the first picture for each of the plurality of GOPs having an unduplicated video sequence is encoded as a reference I picture.

18. The data structure of claim 16, wherein each picture of the plurality of GOPs includes
 a first portion indicative of textual information, and
 a second portion indicative of video information.

19. The data structure of claim 18, wherein the first and remaining pictures in the plurality of GOPs share a common first portion.

20. The data structure of claim 19, wherein the first portion of the first picture of one of the plurality of GOPs is encoded as a reference first portion, and wherein the second portion of the first picture of each of the plurality of GOPs having unduplicated video sequence is encoded as a reference video portion.

21. The data structure of claim 19, wherein the common first portion includes textual information indicative of program guide data.

22. The data structure of claim 16, wherein the first picture for each of the plurality of GOPs having an unduplicated video sequence is encoded as a reference I picture.

23. The data structure of claim 1, wherein the pictures are encoded using picture-based encoding.

24. The data structure of claim 1, wherein the pictures are encoded using slice-based encoding.

25. The data structure of claim 1, wherein the program data comprises an interactive program guide.

26. A data structure, comprising:
 a multiplexed stream comprising a plurality of video streams representing respective first portions of a group of pictures (GOP) information structure, each of said respective first portions including an access unit associated with an I-picture, and a video stream representing a remaining portion of said GOP information structure including at least one of an access unit associated with a P-picture and an access unit associated with a B-picture, wherein:
  a concatenation of one of said respective first portions of said GOP information structure and said remaining portion of said GOP structure results in a complete GOP information structure.

27. The data structure of claim 26, wherein:
 said data structure provides imagery for a plurality of image screens, each of said plurality of image screens including imagery common to all of said plurality of image screens and imagery not common to all of said plurality of image screens;
 said respective first portions of said GOP structure including both common and non-common screen imagery, said respective second portions of said GOP structure including at least common screen imagery.

28. The data structure of claim 26, wherein said GOP comprises one of a closed GOP data structure and an open GOP data structure.

29. The data structure of claim 26, wherein said multiplexed stream comprises a transport stream.

30. A system for providing program data, comprising:
 at least one video encoder operative to receive and encode a plurality of streams to generate a plurality of elements, wherein each stream comprises a group of pictures (GOP) having a first picture and one or more remaining pictures, wherein each of at least one element represents data for at least a portion of the first picture of at least one respective GOP encoded as a reference I picture, and wherein each remaining element represents data for at least a portion of a particular first or remaining picture in one of the GOPs encoded as either an I picture, a P picture, or a B picture;
 a transport multiplexer coupled to the video encoder and operative to receive the plurality of elements and generate a transport stream; and
 a modulator coupled to the transport multiplexer and operative to receive the transport stream and generate an output signal suitable for transmission.

31. A set top terminal (STT) for receiving program data, comprising:
 a demodulator operative to receive a modulated signal and generate a transport stream;
 a transport de-multiplexer coupled to the demodulator and operative to receive and process the transport stream to provide a plurality of elements; and a video decoder coupled to the transport de-multiplexer and operative to receive the plurality of elements, and decode and combine selected ones of the plurality of elements to provide a stream for a selected channel, and wherein the plurality of elements represent data for a plurality of streams, wherein each stream comprises a group of pictures (GOP) having a first picture and one or more remaining pictures, wherein each of at least one element represents data for at least a portion of the first picture of at least one respective GOP encoded as a reference I picture, and wherein each remaining element represents data for at least a portion of a particular first or remaining picture of one of the GOPs encoded as either an I picture, a P picture, or a B picture.

* * * * *